(12) United States Patent
Lowell et al.

(10) Patent No.: US 8,750,899 B2
(45) Date of Patent: *Jun. 10, 2014

(54) FLEET MANAGEMENT SYSTEM AND METHOD EMPLOYING MOBILE DEVICE MONITORING AND RESEARCH

(71) Applicant: Trimble Navigation Limited, Sunnyvale, CA (US)

(72) Inventors: James Russell Lowell, Lakeville, MN (US); Ronald Edward Konezny, Shorewood, MN (US); Andrew Johnson, Minnetonka, MN (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/894,125

(22) Filed: May 14, 2013

(65) Prior Publication Data

US 2013/0316731 A1 Nov. 28, 2013

Related U.S. Application Data

(63) Continuation of application No. 13/341,295, filed on Dec. 30, 2011, now Pat. No. 8,442,555.

(60) Provisional application No. 61/429,012, filed on Dec. 31, 2010.

(51) Int. Cl.
*H04W 24/00* (2009.01)

(52) U.S. Cl.
USPC ...................................... 455/456.1

(58) Field of Classification Search
CPC .................................... H04W 24/00

USPC ............ 455/456.2, 404.2, 457, 456.1, 456.3, 455/41.2, 418, 405, 566; 342/457; 340/539.11, 5.7; 701/99, 29.1; 715/738, 736

See application file for complete search history.

(56) References Cited

U.S. PATENT DOCUMENTS

| | | | |
|---|---|---|---|
| 7,123,907 B2 | 10/2006 | Sumcad et al. | |
| 7,353,019 B2 * | 4/2008 | Martin | ................ 455/424 |
| 8,442,555 B2 | 5/2013 | Lowell et al. | |
| 2009/0088924 A1 * | 4/2009 | Coffee et al. | ................ 701/33 |
| 2009/0164551 A1 | 6/2009 | Oesterling et al. | |
| 2012/0008509 A1 | 1/2012 | Myers et al. | |

OTHER PUBLICATIONS

File History for U.S. Appl. No. 13/341,295.

* cited by examiner

*Primary Examiner* — Kiet Doan
(74) *Attorney, Agent, or Firm* — Hollingsworth Davis, LLC

(57) ABSTRACT

Systems, apparatuses and methods for monitoring wireless communication performance. A fleet of moving vehicles equipped with communication devices communicate data call records, including a geographic location of the vehicle when the communication was attempted, to a central office. Indications of successful and unsuccessful call record communications attempts are aggregated by geographic area using the geographic location data from the vehicles. Call success rate levels for the geographic areas are determined based on the aggregated indications of successful and unsuccessful call record communication attempts. These levels may be presented on geographical maps or otherwise, and/or used for network analysis purposes.

20 Claims, 18 Drawing Sheets

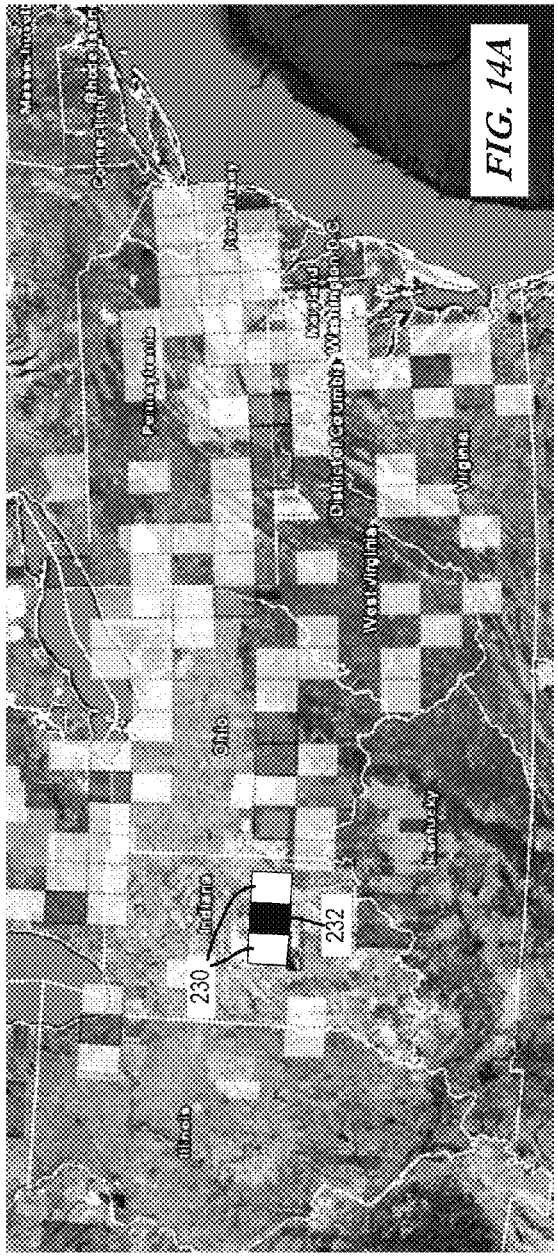
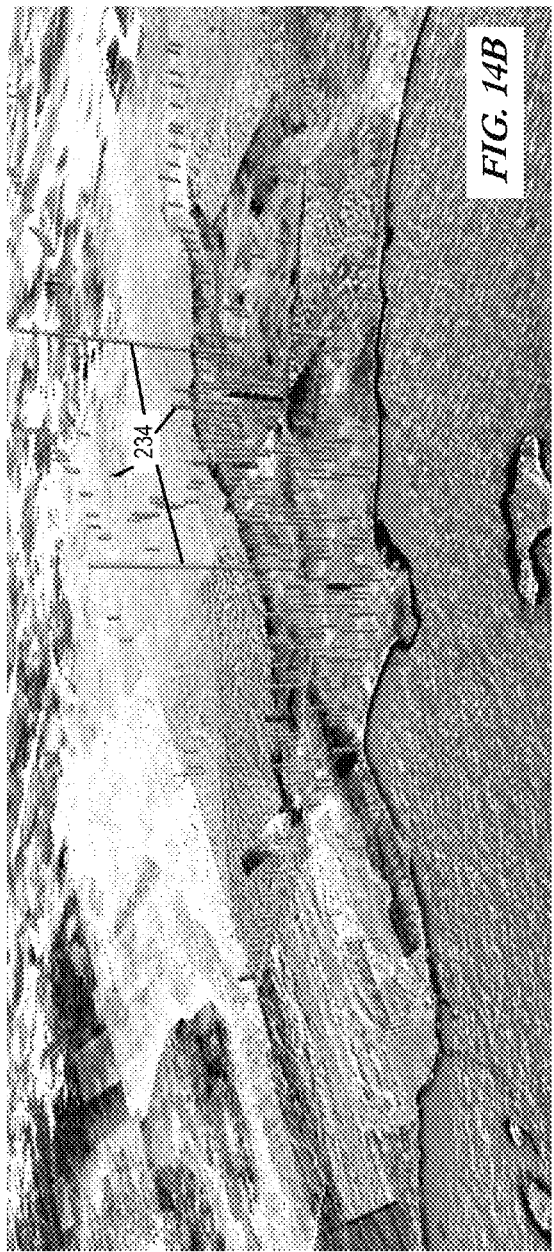
FIG. 14A
FIG. 14B

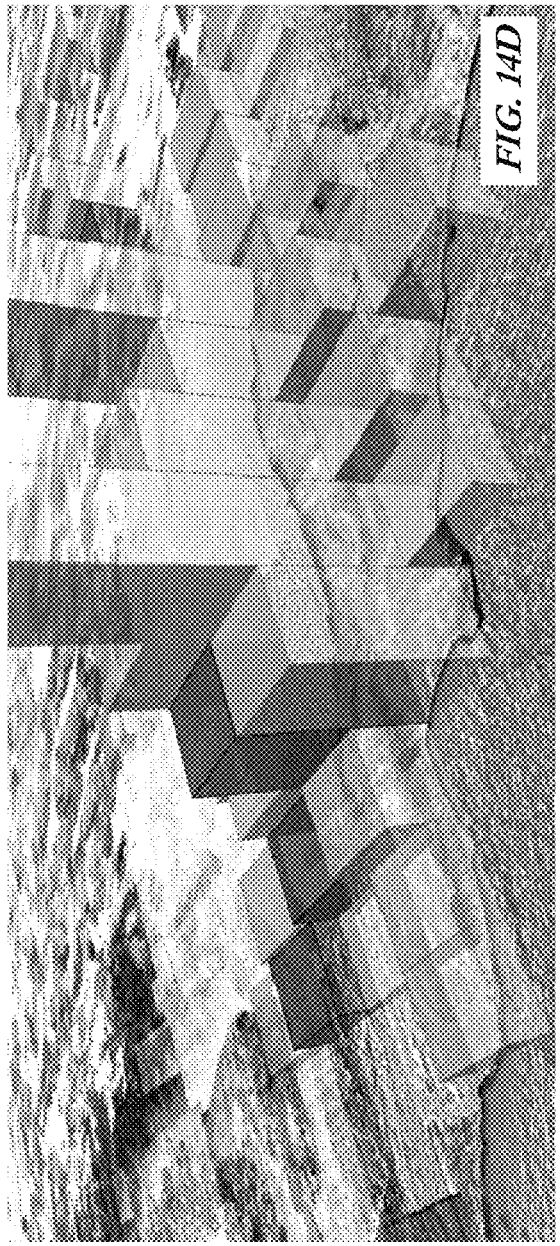

VEHICLE COUNT: 85

| DSN | COUNT | FAILURES | NDPID | PRLID | CARRIERID | MIN | FIRMWARE VER. | RADIO |
|---|---|---|---|---|---|---|---|---|
| 1076763 | 284 | 280 | 90 | 0 | 1 | 5554614679 | 002.005.13 | CM52 |
| 1119872 | 200 | 6 | 87 | 0 | 2 | 5552278591 | 002.003.07 | CM52 |
| 1026671 | 142 | 4 | 90 | 0 | 1 | 5557609371 | 002.003.07 | CM42 |
| 1095081 | 134 | 112 | 90 | 0 | 1 | 5559003060 | 002.005.13 | CM52 |
| 1021010 | 128 | 124 | 90 | 0 | 1 | 5558929329 | 002.007.12 | CM42 |
| 1078556 | 125 | 2 | 89 | 122 | | | 002.001.07 | CM52 |
| 1030466 | 112 | 94 | 90 | 184 | 1 | 5554615771 | 002.007.12 | CM42 |
| 1103662 | 112 | 90 | 90 | 184 | 1 | 5558928182 | 002.005.12 | CM52 |
| 1099007 | 111 | 61 | 90 | 0 | 1 | 5556666643 | 002.005.13 | CM52 |
| 1204636 | 103 | 99 | 95 | 0 | 1 | 5556202526 | 002.005.13 | CM52 |
| 1112180 | 102 | 100 | 90 | 0 | 1 | 5554617402 | 002.005.13 | CM52 |
| 1045931 | 101 | 0 | 89 | 122 | 3 | 5556067308 | 002.001.07 | CM42 |

*FIG. 16*

FLEET MANAGEMENT SYSTEM AND METHOD EMPLOYING MOBILE DEVICE MONITORING AND RESEARCH

RELATED APPLICATIONS

This application is a continuation of U.S. application Ser. No. 13/341,295, filed Dec. 30, 2011, to issue as U.S. Pat. No. 8,442,555, which claims the benefit of Provisional Patent Application No. 61/429,012, filed on Dec. 31, 2010, which are incorporated herein by reference in their entireties.

SUMMARY

Embodiments described in this disclosure are generally directed to methods and apparatuses for enhanced fleet management using mobile device monitoring and research. According to various embodiments, methods of the disclosure involve moving a plurality of wireless communication devices by a plurality of vehicles relative to a plurality of geographically defined communication service regions. Data transmissions comprising vehicle data are initiated by the communication devices as the vehicles move in, through, and out of the geographically defined communication service regions. The vehicle data comprises at least identification data that uniquely identifies each communication device and location data indicative of a geographical location of each vehicle at the time of data transmission initiation. At least the vehicle data associated with each data transmission is stored locally at each vehicle as a call record.

Call records are received substantially in real-time at a central office from the communication devices that successfully establish a connection with the central office at the time of data transmission initiation. Call records are received in a store and forward mode at the central office from the communication devices that were unable to successfully establish a connection with the central office at the time of data transmission initiation.

According to some embodiments, methods further involve generating, substantially in real-time at the central office, a data table comprising at least the vehicle data for call records received at the central office via the successfully established connections. Methods also involve updating the data table to incorporate at least the vehicle data for call records received at the central office via the store and forward mode. The updated data table reflects time of occurrence of data transmission initiation for each call record received substantially in real-time and in the store and forward mode.

In other embodiments, methods further involve identifying which of a plurality of potential points of failure contributed to the inability to successfully establish a connection between a particular communication device and the central office at the time of data transmission initiation. According to some embodiments, methods further involve generating an output indicative of relative success and lack of success in establishing a substantially real-time connection between the communication devices and the central office at the time of data transmission initiation for each of the geographically defined communication service regions.

In accordance with various embodiments, a system includes a mobile communication apparatus and a remote system. The mobile communication apparatus includes a wireless communication device configured for deployment at a vehicle that transits relative to a plurality of geographically defined communication service regions. A processor is coupled to the communication device and configured to initiate data transmissions comprising vehicle data as the vehicle moves in, through, and out of the geographically defined communication service regions. The vehicle data comprises at least identification data that uniquely identifies the mobile communication apparatus and location data indicative of a geographical location of the vehicle at the time of data transmission initiation. A memory is coupled to the processor and configured to store at least the vehicle data associated with each data transmission as a call record.

The remote system is configured to communicate with each of a plurality of the mobile communication apparatuses. The remote system comprises a receiver configured to receive, substantially in real-time, call records from the communication devices that successfully establish a connection with the remote system at the time of data transmission initiation. The receiver is configured to receive, in a store and forward mode, call records from the communication devices that were unable to successfully establish a connection with the remote system at the time of data transmission initiation. A processor is configured to generate, substantially in real-time, a data table comprising at least the vehicle data for call records received at the remote system via the successfully established connections. The processor is configured to update the data table to incorporate at least the vehicle data for call records received at the remote system via the store and forward mode. The updated data table reflects time of occurrence of data transmission initiation for each call record received substantially in real-time and in the store and forward mode.

These and other features can be understood in view of the following detailed discussion and the accompanying drawings.

BRIEF DESCRIPTION OF THE DRAWINGS

FIGS. 14A-14D depict representative manners for depicting call success/failure rates and possibly related call volume;

FIG. 16 is a table illustrating a representative manner of presenting past call record data.

DETAILED DESCRIPTION

In general, the disclosure is directed to techniques for monitoring and analyzing wireless communication performance. Traveling vehicles equipped with communication devices are configured to communicate data to a data center or other central office system. While the vehicles and/or drivers need not have any association with one another, the vehicles may be part of one or more fleets of vehicles, such as in the trucking industry. The central office may serve as a fleet management system in which the trucks or other vehicles communicate, regardless of which fleet, if any, they may be associated with. The fleet management system delivers an array of services and solutions utilizing a fleet of mobile communication devices in the vehicles, and therefore the performance of the wireless networks and other interconnected elements of technology can reflect on the performance of the fleet management system.

The solutions presented herein enable such a fleet management system, or any other entity concerned with performance of wireless communications, to track performance through actions such as monitoring, real-time and historical analysis, diagnosis and troubleshooting of the involved networks and related technology. For example, techniques disclosed herein can facilitate the discovery of poorly performing cellular system identifier (SID) areas and markets, device disconnects and failures from a wireless carrier, and failures or performance degradation of provider resellers and/or third party backbones. The techniques can also determine the general performance and other information associated with the communication devices in vehicles, such as code releases, reception/signal strength, and the like.

Without techniques described herein, identification of communication problems may resort to waiting for customers to call in to report the problem, and gather "complaint metrics." Carriers themselves may not know of a network problem before a substantial number of users are adversely affected. The techniques described herein solve these and various other problems. The techniques of the disclosure facilitate access to detailed call metrics that providers do not otherwise have access to. Proactive outbound customer communication can be used instead of relying on inbound customer communication or complaints. In accordance with the disclosure, data can be aggregated in real-time, whereby issues can often be identified before the provider takes action, paging on issues can be intelligent and immediate, intermittent "hiccups" in performance are identifiable without diluting from historical backfill data. Further, the data is aggregated for long-term queries, where research on historical events and long-trending patterns is possible. The techniques described herein address these and other issues.

Figure 1:
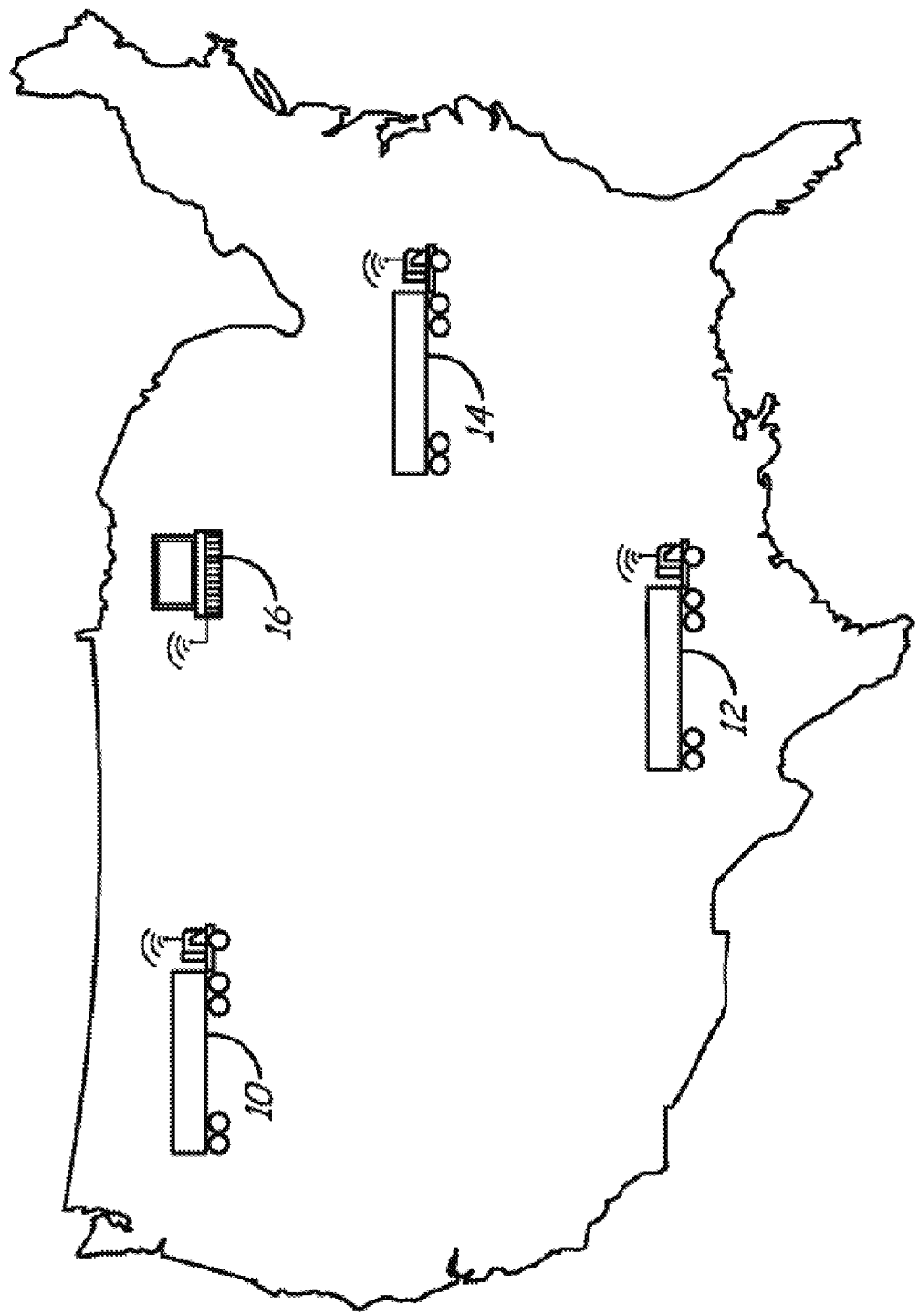
FIG. 1 is a diagrammatic illustration of a representative fleet management system with which embodiments of the disclosure are particularly applicable.

FIG. 1 is a diagrammatic view of a representative fleet management system with which various embodiments of the disclosure are particularly applicable. As illustrated in FIG. 1, a fleet may include heavy vehicles 10, 12, and 14 moving through different location of the country. Each of the vehicles 10, 12, and 14 is configured to communicate wirelessly with a central communication server 16. While the vehicles illustrated in FIG. 1 are depicted as trucks, other vehicles that traverse cellular areas or other wireless communication areas may alternatively or additionally be equipped with communication devices. The vehicles may be, for example, trucks, cars, buses, motorcycles, trains, ships, or other vehicles that include the relevant communication capability and are capable of moving between cellular areas, satellite areas or the like. Thus, it should be recognized that references to any one or more of the vehicle types is not intended to limit the particular description to the particular type of vehicle unless specifically noted as such.

Figure 2A:
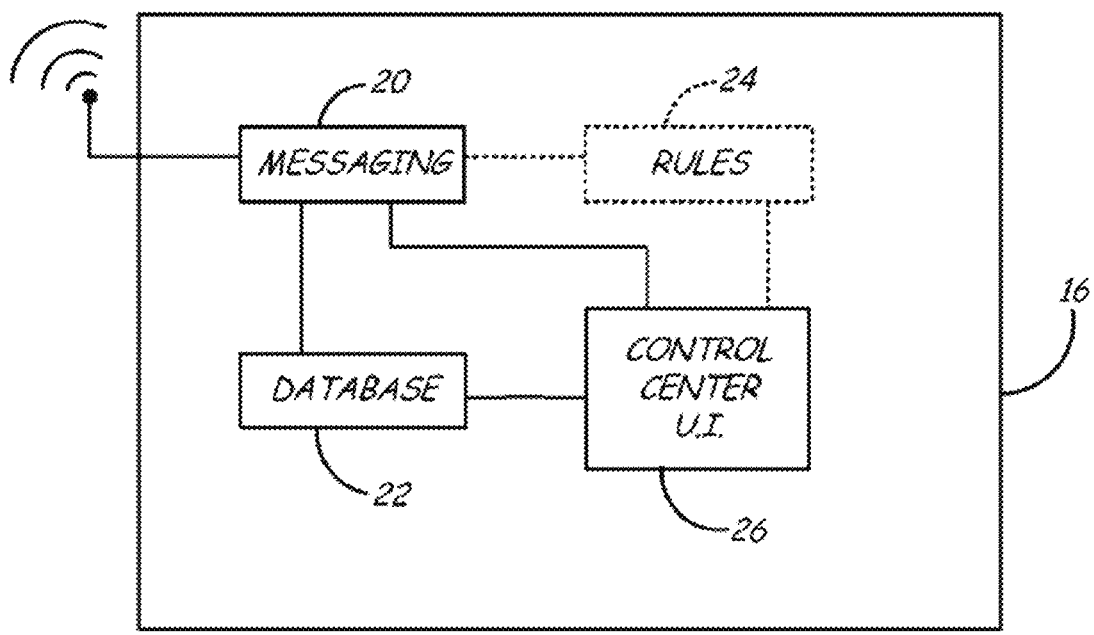
FIGS. 2A and 2B are block diagrams of a central communication center and a mobile communication device provided in a vehicle, in accordance with various embodiments.
Figure 2B:
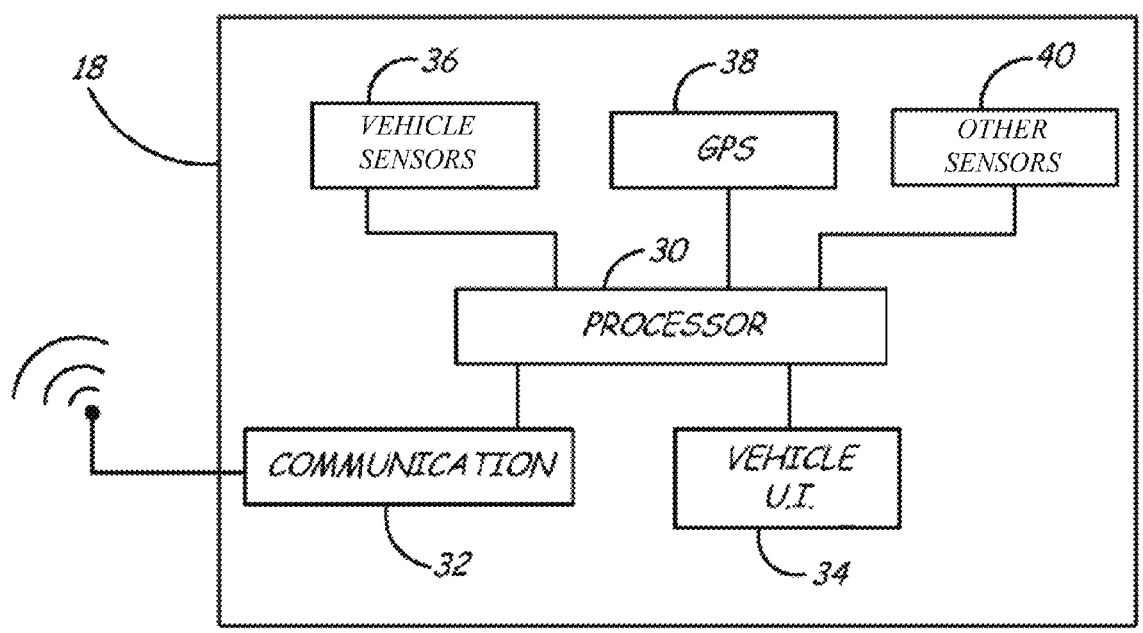

FIGS. 2A and 2B are block diagrams respectively depicting selected components of a representative central communication center or central office 16, and a communications device 18 provided in a vehicle. As used herein, references to a central communication center, central office, data center or other similar reference, do not imply that the entity is necessarily a single facility, although it may be. As indicated in FIG. 2A, the representative control center 16 includes, among other things, a messaging module 20 that is configured to communicate using at least one form of wireless communication. While messaging module 20 is illustrated in FIG. 2A as being coupled to an antenna, messaging module 20 need not be actually coupled to a physical antenna. The antenna is simply provided for clarity of description. In fact, messaging module 20 may be configured to pass electronic messages to another module or third-party service, such as a wireless communication provider (Verizon, Sprint, et cetera), which then transmits a wireless message using any suitable technology to device 18.

The message is wireless in the sense that it is communicated over-the-air (OTA) as it arrives at device 18. Wireless communication can take the form of cellular communication, such as known CDMA technology, global system for mobile communications (GSM) technology, worldwide interoperability for microwave access (WiMax) technology, or any other suitable technology now known or later developed. Additionally, messaging module 20 may be configured to communicate in accordance with two or more such known technologies. Messaging module 20 is preferably coupled to a database 22 that is configured to store at least call records received from the mobile communication devices 18. Call records can contain an enormous amount of information collected by the communications device 18 regarding cell signal strength, GPS location, Service Identifier (SID) or analogous cellular network identifier, channel, baud, data payload, and duration, for example. Call records include vehicle data for each fleet vehicle that communicates with the central office. Vehicle data includes at least identification data that uniquely identifies each communication device and location data indicative of a geographic location of each vehicle at the time of data transmission initiation. The vehicle data associated with each data transmission is stored locally at each vehicle as a call record or other data packet, and transmitted to the central office on a repeated and/or prompted basis. Some of this information, like call duration, bytes sent/received, and all failed call attempts are recorded and sent on a subsequent data call, such as the first successful data call following one or more failed call attempts. In one embodiment, this historical "back-fill" data is recorded, and plotted.

Control center UI 26 is coupled to messaging module 20, database module 22, and optional rules module 24. Control center UI 26 generally is in the form of one or more personal computers through which a human operator can view messages and other data from individual vehicles as well as corresponding database information and/or rules. The operator can then communicate with one or more operators of the vehicles or take other suitable action as may be appropriate. The control center's ability to monitor and/or communicate with a plurality of vehicles and/or groups of vehicles facilitates a number of useful functions. For example, an operator at the control center can analyze information received from the vehicles (either real-time or historical) and provide reports based on the analysis. Further, these reports can be provided, such as via a web server, to owners, operators and/or interested parties. The control center can provide the alerts and/or reports to drivers, dispatchers, and/or any relevant party in the entire supply chain shipper/receiver). The alerts can be sent via email to any suitable address, including addresses of mobile phones of any suitable person. Further still, the alerts and/or reports may be sent via the SMS message system (i.e. text message).

Module 18 is representative of what may reside in each vehicle monitored in accordance with embodiments of the present invention. Module 18 is preferably powered by the power system of the vehicle and includes a processor(s), such as a microprocessor, 30. Processor 30 is coupled to communication module 32 which is configured to cooperatively communicate with messaging module 20 of central communication center 16. Accordingly, communication module 32 can include one or more of the various technologies listed above with respect to messaging module 20. Processor 30 may also be operably coupled to an in-cab user interface 34. User interface 34 may simply be an LCD screen and one or more buttons to allow an operator to confirm or cancel various commands and messages. However, user interface 34 can also comprise an entire touchscreen interface operably coupled to processor 30. Moreover, user interface 34 also includes suitable software to interact with the touch screen to provide various data and/or interactions with the user.

Among other things, the disclosure describes techniques for monitoring the performance of networks by which communication devices in vehicles communicate their transportation information. As vehicles associated with the system of the present invention move about the country or beyond, they may collectively be physically present in many, most, or even all of the cellular network coverage areas. The techniques involve obtaining information regarding successful or unsuccessful data call attempts involving the vehicle, which provides a plethora of information regarding the performance of the cellular or other networks by which the communications are made. As vehicles roam from poor performing networks into operating networks, past call failure information can be provided with successful calls. The successful calls may provide information such as location data, and system identification numbers (SID) that are broadcast by base stations to identify the cellular network over which a data call is being attempted. Such information is processed, and reports, graphs, charts, audio information, and other presentations can be provided. The presented information can reveal where call failures have been occurring. Interactive tools enable particular geographic areas, particular calls or other items to be analyzed in greater depth to help identify the root of the communication failures.

Figure 3:
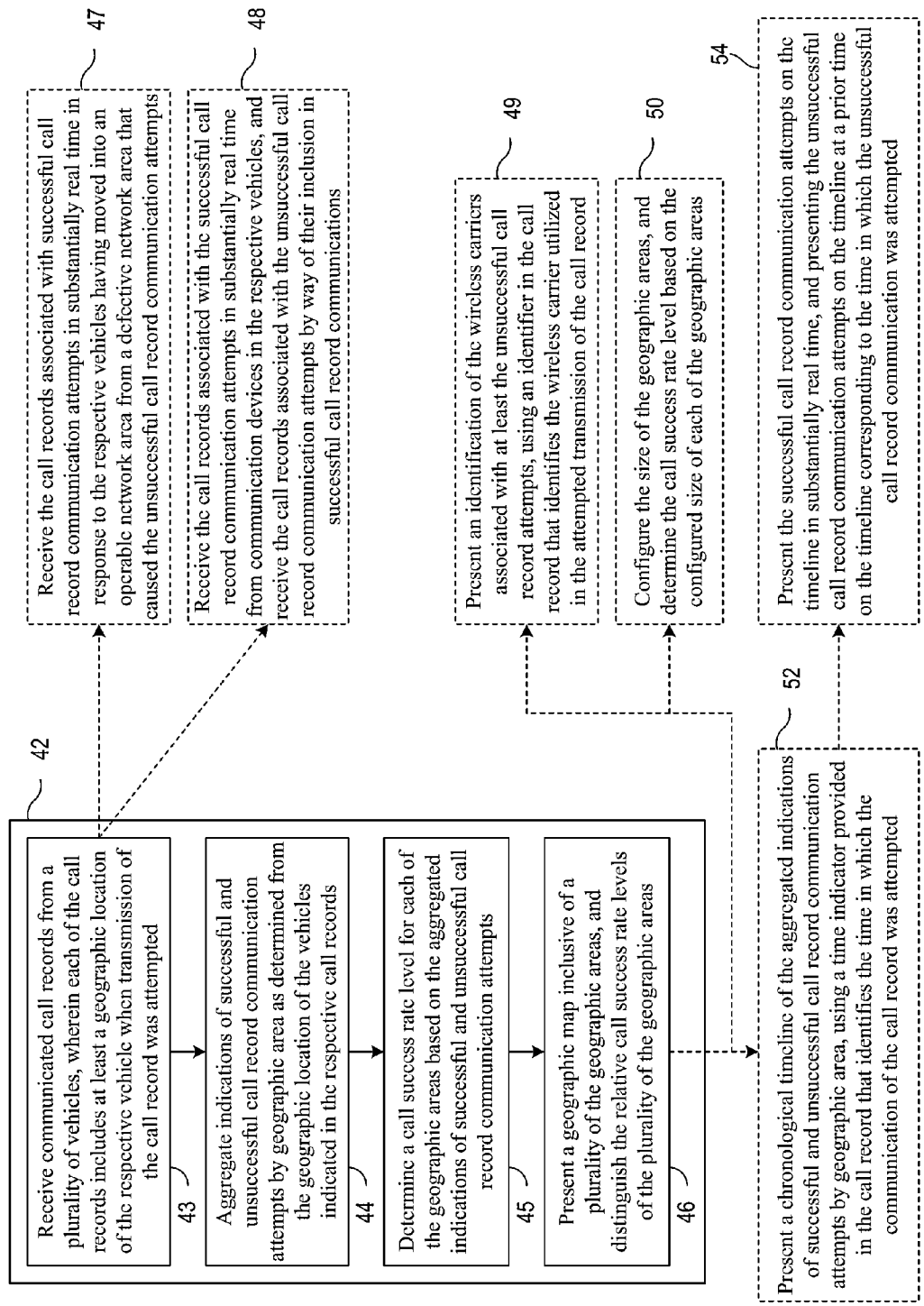
FIGS. 3-6 are flow diagrams illustrating representative embodiments for monitoring the performance of a communication network.

One representative manner for monitoring the performance of a communication network is illustrated in the flow diagram of FIG. 3. A first technique is depicted by flow diagram 42. In this embodiment, a central office or other processing system receives 43 communicated call records from multiple vehicles. Such vehicles may be distributed within any geographic area, ranging from a small geographic area such as a city, to a large geographic area such as North America or beyond. Each of the call records includes at least a geographic location of the respective vehicle when transmission of the call record was attempted. Geographic location may be obtained by, for example, GPS or other satellite location systems, cellular triangulation, etc.

As shown at block 44, the system can aggregate indications of successful and unsuccessful call record communication attempts by geographical area as determined from the geographic location of the vehicles indicated in the respective call records. For example, the system can review the received call records and determine from the call records that 260 of 300 data call attempts in geographic area-A were successful; 436 of 437 data call attempts in geographic area-B were successful, etc. Block 45 shows that a call success rate level for each of the geographic areas may be determined based on the aggregated indications of successful and unsuccessful call record communication attempts. For example, one success rate level may be determined to be 90%-100% success rate, another level may be determined to be 80%-89.9% success rate, and so forth.

A geographic map that includes one or more, and often many, of the geographical areas may be presented 46, where the relative call success rate levels of the geographical areas are distinguishable from one another. For example, colors, numbers, letters and/or any other distinguishable indicia may be used to identify the call success rate of the various geographical areas. In this manner, it can be quickly and accurately determined where on the map the data calls are being successfully communicated, and where there may be problems with the wireless carriers, backbone networks and/or other points of potential failure.

FIG. 3 depicts various alternatives to the method 42. For example, as shown at block 47, the call records associated with successful call record communication attempts may be received by the system in substantially real-time, in response to the vehicles having moved into an operable network area from a defective network area that caused the unsuccessful call record communication attempts. For example, where a wireless carrier's network has temporarily failed or exhibits problems transmitting the call records, the vehicle cannot transmit a scheduled, requested or voluntarily-submitted call record while in the defective network area. Upon moving out of the defective area and entering a network area that is operative, the call record is properly communicated.

In one embodiment shown at block 48, such successful call record communication attempts are received in substantially real-time from communication devices in the vehicles, but call records associated with previously unsuccessful call record communication attempts are received by way of their inclusion in other successful call record communications. As a more particular example, a truck may unsuccessfully attempt to transmit a call record, and may attempt to retry to send periodically or otherwise. In one embodiment, each of these attempts results in a call record that cannot be transmitted due to the faulty network or other problem preventing successful transmission. When the network resumes proper operation, the vehicle moves into an operable network, or an alternative transmission technology is used (e.g. satellite), each of the call records associated with the failed attempts are appended or otherwise included in a call record that is successfully transmitted (e.g. the first successfully transmitted call record) from the vehicle to the central office. In this manner, the central office is notified of call records indicating unsuccessful call record transmission attempts by way of piggy-backing those call records onto a successful call record.

In another alternative embodiment, successful and unsuccessful data call attempts can be attributed to the wireless carriers associated with those attempts. As shown at block 49, an identification of the wireless carriers associated with at least the unsuccessful call record attempts may be presented, such as displayed. An identifier in the call record identifies the geographic area and/or network carrier utilized in the attempted transmission of the call record. For example, a system identification number, or SID, can be provided in the call record to indicate area and wireless carrier in which the call was attempted. For example, a SID identifying Sprint Nextel in areas of Alabama may have a SID of 4103, which can be included in a call record if the call is made via the Sprint Nextel network in that area. As both successful and unsuccessful call records can include such a wireless carrier identifier, the information may be presented to enable analysis of whether a wireless carrier's network may be the cause of a problem experienced by vehicles in that area.

Another alternative embodiment involves configuring the size of the geographic areas presented on the geographic map. This is depicted at block 50. The call success rate level can then be based on the configured size of each of the geographic areas. For example, the geographic area can be configured to be 100 square miles, and the map may present the entire U.S. Where a lower than desired call success rate is identified in some area, such as a portion of Alabama, the size of the geographic area may be reconfigured to 10 square miles or any other desired size. In this manner, one can diagnose problem areas at the appropriate geographical area, which can assist in diagnosing the cause of the undesirable call success rate in that area.

In another alternative embodiment, a chronological timeline may be presented 52 of the aggregated indications of successful and unsuccessful call record communication attempts by geographic area, using a time indicator provided in the call record that identifies the time in which the communication of the call record was attempted. Another embodiment addresses how unsuccessful calls are placed on that timeline, which is shown at block 54. In this embodiment, the successful call record communication attempts are presented on the timeline in substantially real-time, whereas the unsuccessful call record communication attempts are presented on the timeline at a prior time on the timeline corresponding to the time in which the unsuccessful call record communication was attempted. For example, in the embodiment shown at block 48, it was noted that call records associated with unsuccessful call attempts may be provided with a successful communication of a call record. Thus, the vehicle stores the unsuccessfully-transmitted call records, and includes them with the next attempted call record transmission, until a call record is successfully transmitted. Since those call records associated with unsuccessful call attempts occurred at a prior time, they are positioned on the timeline at the time they actually occurred. In this disclosure, this process is generally referred to as "backfilling," which will be described in greater detail below.

Figure 4:
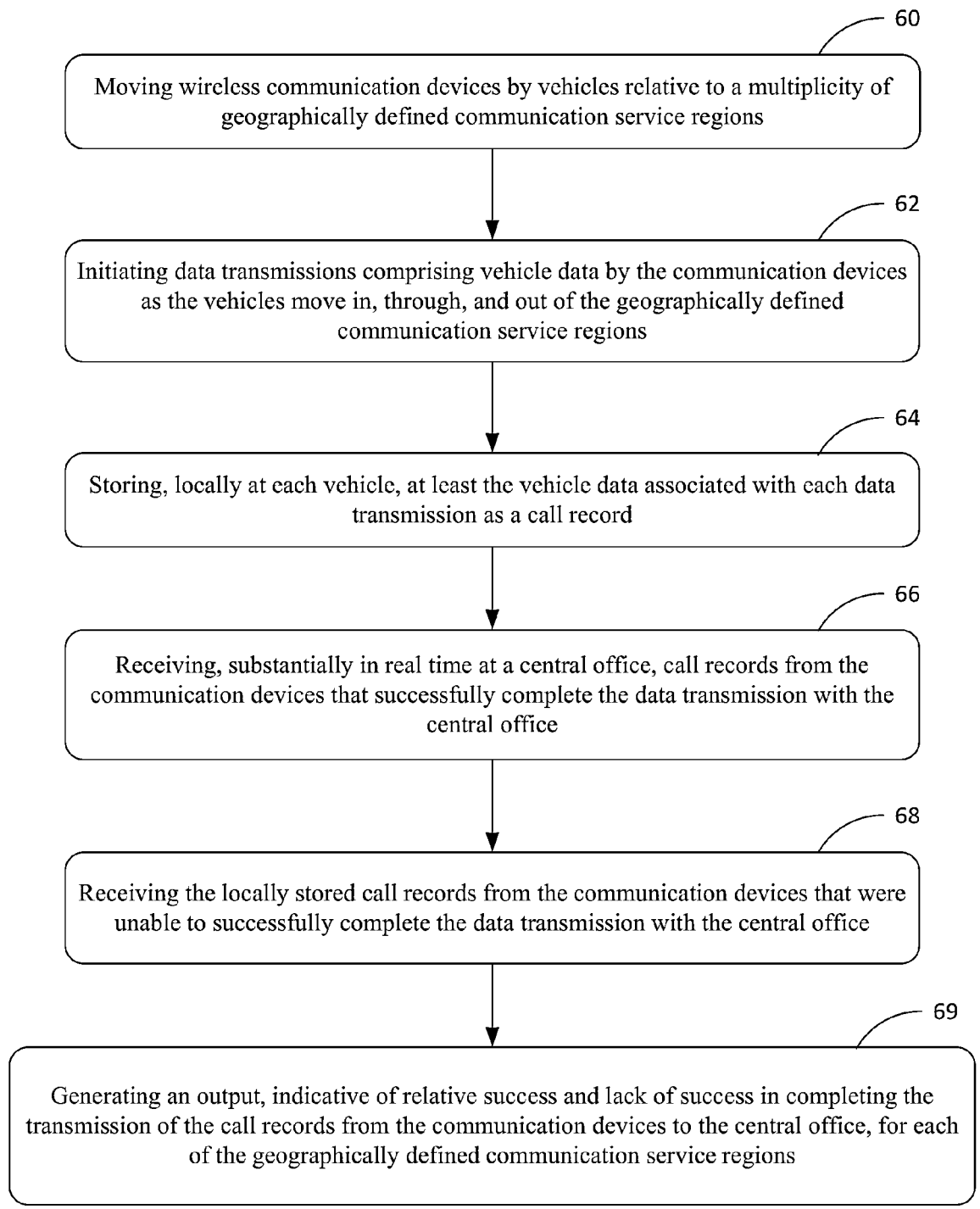

As noted above, some embodiments involve providing unsuccessfully transmitted call records to the central office or other designated processing system in one or more subsequent call records that are successfully sent. In such embodiments, the communication devices at the vehicles store the call records associated with unsuccessful call record transmission attempts, and attach or otherwise include such call records with a next attempted transmission of a call record. FIG. 4 is a flow diagram illustrating such a method, where unsuccessful call records are locally stored at the vehicles, and an output showing relative success of call record transmission is generated.

At block 60, wireless communication devices are moved by vehicles relative to a multiplicity of geographically defined communication service regions. Data transmissions that include vehicle data are initiated 62 by the communication devices as the vehicles move about the geographically defined communication service regions. At least the vehicle data associated with each data transmission attempt is stored 64 as a call record locally at each vehicle. Call records from the communication devices that successfully complete the data transmission with the central office are received 66 at the central office in substantially real-time. At block 68, the locally stored call records from the communication devices that were unable to successfully complete the data transmission with the central office are also received, albeit in one embodiment at a time later than when the data transmission attempt actually occurred. Block 69 involves generating an output, indicative of relative success and lack of success in completing the transmission of the call records from the communication devices to the central office, for each of the geographically defined communication service regions.

Figure 5:
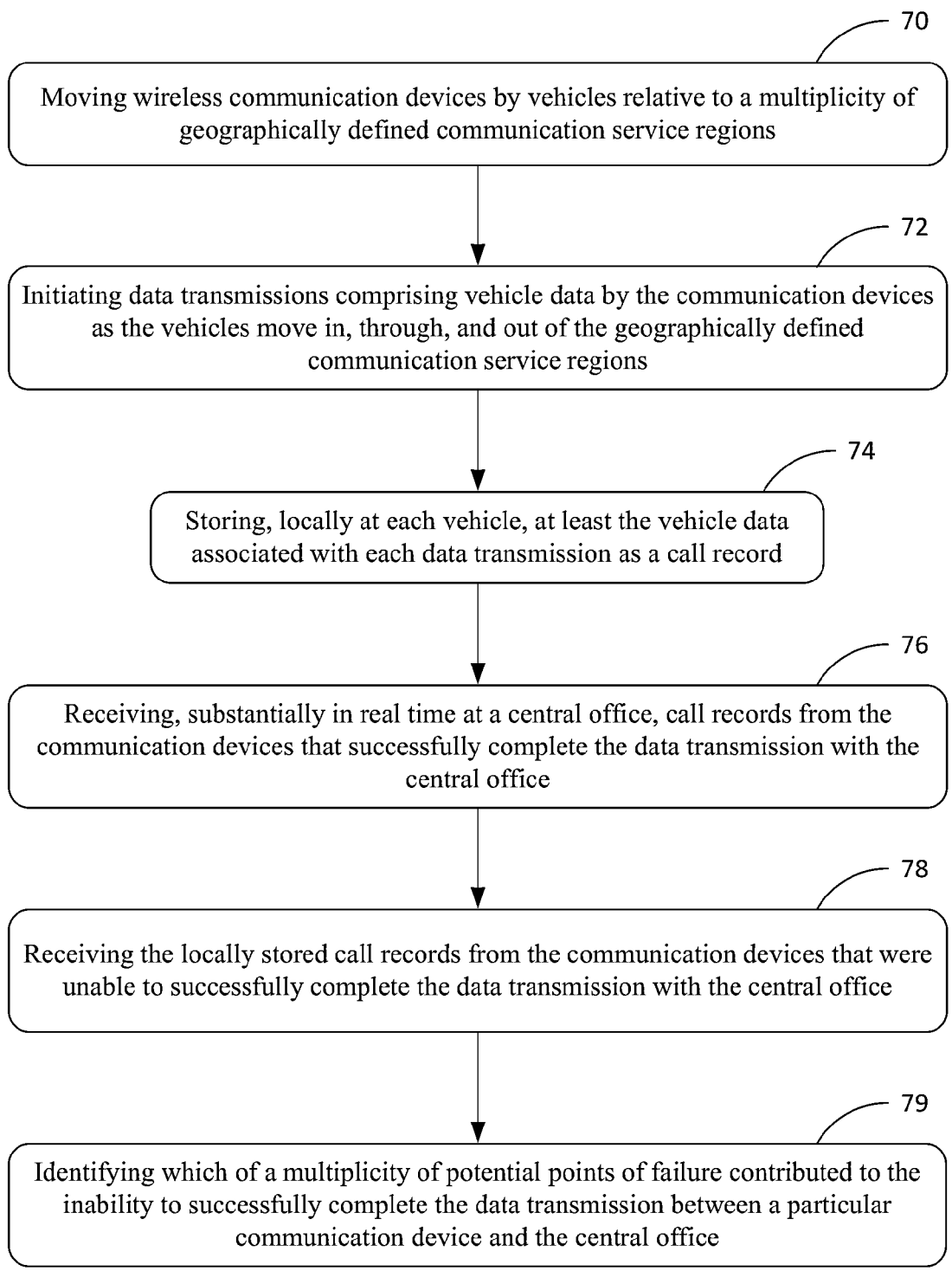

In addition to providing an output to view or otherwise be presented with relative success of call record transmissions, other embodiment additionally or alternatively facilitate analyzing the received call records to identify or focus in on the potential points of failure that contributed to unsuccessful call record transmissions. FIG. 5 is a flow diagram illustrating a technique where unsuccessful call records are locally stored at the vehicles, and a research tool enables identification of a possible point(s) of failure in the transmission path for one or multiple vehicles experiencing call failures.

In this embodiment, various operations are analogous to those of FIG. 4. At block 70, wireless communication devices are moved by vehicles relative to a multiplicity of geographically defined communication service regions. Data transmissions that include vehicle data are initiated 72 by the communication devices as the vehicles move about the geographically defined communication service regions. At least the vehicle data associated with each data transmission attempt is stored 74 as a call record locally at each vehicle. Call records from the communication devices that successfully complete the data transmission with the central office are received 76 at the central office in substantially real-time. At block 78, the locally stored call records from the communication devices that were unable to successfully complete the data transmission with the central office are also received, albeit in one embodiment at a time later than when the data transmission attempt actually occurred. For example, the call records from unsuccessful call attempts may be received by way of their inclusion in a successful call record, thus being provided to the central office by way of a store and forward mode. The embodiment of FIG. 5 further involves identifying 79 which of a multiplicity of potential points of failure contributed to the inability to successfully complete the data transmission between a particular communication device and the central office.

Figure 6:
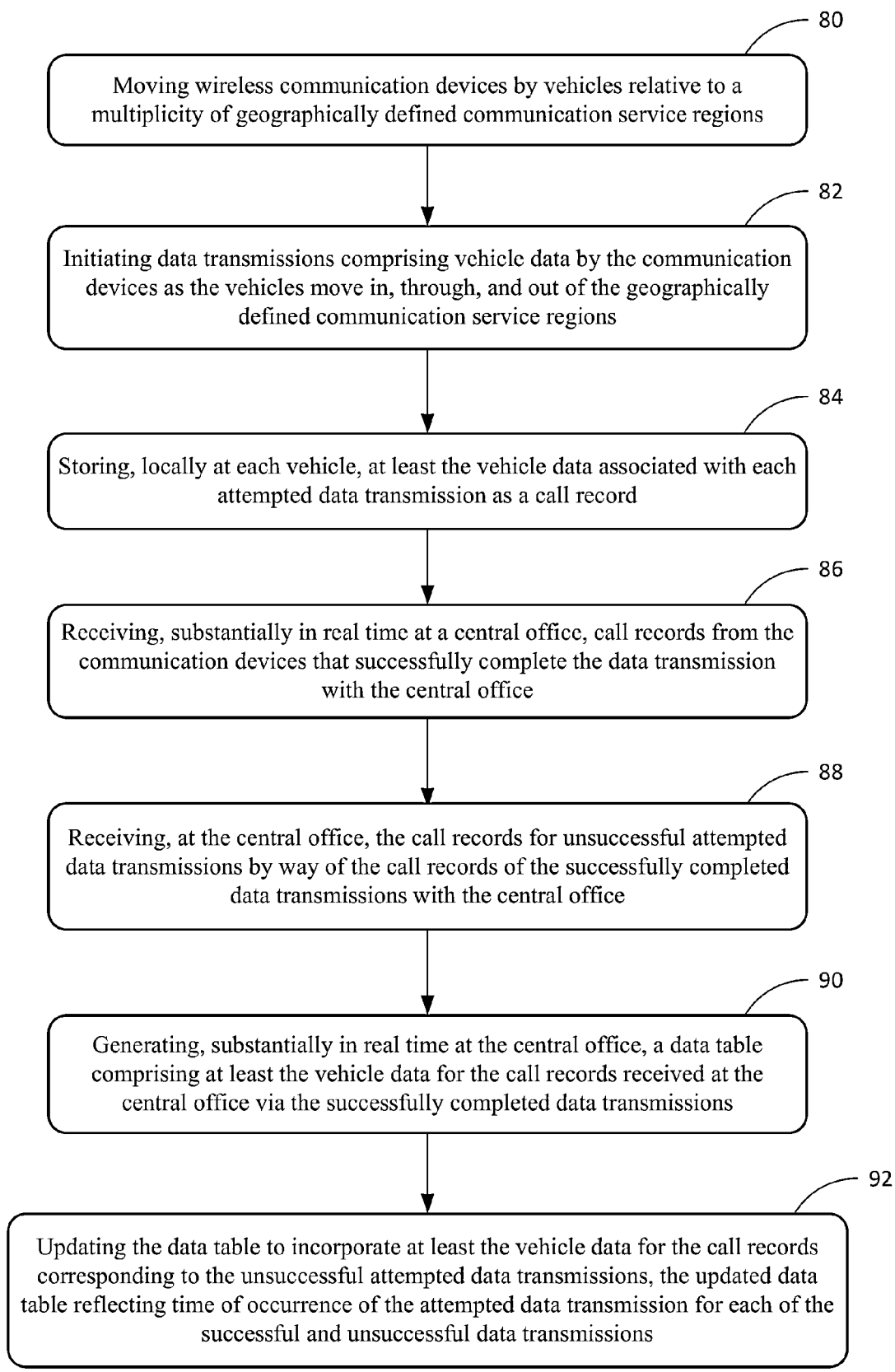

FIG. 6 illustrates another embodiment that involves the backfilling technique introduced above, embodiments of which are now described. In one embodiment, a research tool is provided that provides graphs and/or tables or other presentations of statistics such as call success versus call failure. In a particular embodiment, a first presentation is provided graphically, and a second presentation is provided in tabular form. The graph may show, for example call success information over a desired time period such as four hours, in desired time intervals such as fifteen minutes. Any time period and interval may be implemented. Assuming a four hour time period for purposes of discussion, one side of the graph will show current or near-current time, and the other end of the graph will show four hours ago. This provides at least a visual presentation of statistics, such as call success/failure information, over the last four hour period. As some of the call records that are received are unsuccessfully transmitted call records included with a successfully transmitted call record(s), a process referred to herein as backfilling is used to plot the unsuccessfully transmitted call records at or near the actual time that the unsuccessfully transmitted call records were attempted.

It should be recognized that the "time" that call record transmissions are attempted may be defined as desired. For example, the "time" attributed to a call record may be defined as the time that the call attempt was initiated, the time the call disposition was determined (e.g. time of successful transmission or time that transmission failure became known), a midpoint time between initiation and disposition, or otherwise. Thus, references herein to the time of a call attempt at a particular time are not intended to limit the disclosure to any particular timestamp point, as such references are made for purposes of facilitating an understanding of how the process may be implemented.

When a cellular market fails or otherwise exhibits communication problems, the central office cannot properly communicate with the vehicles in that market. In other words, on-board computers cannot notify the central office of network problems if the data communications cannot be transmitted. In one embodiment an auxiliary communication method (e.g. satellite) is used to provide the call record(s) that could not be sent via the cellular network. However, the added complexities and cost associated with such a solution may not always be acceptable. Thus, one embodiment involves locally storing call records associated with failed call attempts at the on-board computer or other storage device in the vehicles, until the messages can be successfully transmitted via the cellular network. For example, of the potentially large set of trucks moving about the country, some subset of those trucks that experienced communication failures will move out of the network in which the failure(s) occurred, and move into a network in which cellular data communications can be resumed. As previously described, one embodiment involves including the call records associated with failed call attempts with the next call attempt until a call is successfully transmitted. Often, when a truck moves from the poorly operating network into a sufficiently operating network, a call record that includes the call records from previous failed call attempts will be successfully transmitted from the truck to the central office. In such cases, a plurality of call records will be received at the same time from a particular truck, where some of those call records will be indicative of what happened some seconds, minutes, hours or days ago.

In a more particular scenario, assume a truck or other vehicle initiates a data call to a central office. The communication device on the truck has opened up a session, is communicating with the data center at the central office, and then the call ends. In one embodiment, only at the point the call ends does the on-board computer in the truck know whether the call was successful or not. For example, data can be passed and the call ends before completion, or a call attempt may never reach the data center, neither of which is a successful call. Thus, after a call attempt, regardless of success/failure disposition, a call record is written and that call record is delivered on the next successful call in one embodiment. An on-board computer may be configured to retry to send call records periodically, such as every two minutes, or five minutes, etc.

If all of the call records were plotted on a time graph/table at the time they were received, the "present" (or near present) time may inaccurately reflect a greater number of call failures than actually occurred at the near present time. For example, if a truck moves from a bad market to a good market, and the successful call records includes fifty call records from prior unsuccessful call attempts, plotting all fifty-one records on the graph/table at the "present" time would suggest that fifty calls failed at the present time. This may not accurately reflect the actual conditions at the present time, as those fifty failed call attempts may have occurred over the last hour or other time period. Similarly, since many call records from failed call attempts have not yet been able to establish or maintain a connection to successfully provide notification of prior failed call attempts, at present it may not be known that a problem even exists in an area. In other words, the present time may not reflect an inordinate number of call failures, because the cause of the problems may not have yet been remedied. For example, trucks experiencing call failures may not yet have moved into a market in which a successful call can be completed, or on-board computer communication glitches may not yet have been resolved, central office problems may not yet have been resolved, etc. For at least these reasons, one embodiment utilizes a backfill process as described below.

Particularly, as data arrives, it is determined where in the timeline (e.g. four hour timeline, eight hour timeline, etc.) each of those records should be plotted or otherwise inserted. As call records that include prior call records associated with failed call attempts arrive over time, those call records are backfilled into the timeline corresponding to the time of the timestamp.

Thus, the timestamp or other time indication in each of the received call records, whether from a successful or failed call attempt, is used to plot the call attempt at the appropriate or actual time of the call attempt. As time moves backwards, the data becomes more accurate as the communication devices on the vehicles have managed to send call records including both the successful and unsuccessful call attempts. For example, where network problems are a primary cause of failed call attempts, and as the failed call attempts are plotted back in time commensurate with their timestamps, the graph/table will begin to accurately reflect a higher number of failures back in time which can then be analyzed to determine which wireless carrier and/or networks are experiencing problems.

Referring now to the flow diagram of FIG. 6, block 80 shows that wireless communication devices are moved by vehicles relative to a multiplicity of geographically defined communication service regions. Data transmissions including vehicle data are initiated 82 by the communication devices as the vehicles move in, through, and out of the geographically defined communication service regions. At least the vehicle data associated with each attempted data transmission is locally stored 84 at each vehicle as a call record. Call records from the communication devices that successfully complete the data transmission with the central office may be received 86 substantially in real-time. The central office also receives 88 the call records for unsuccessful attempted data transmissions by way of the call records of the successfully completed data transmissions with the central office. Block 90 depicts generating 90, in substantially real-time at the central office, a data table including at least the vehicle data for the call records received at the central office via the successfully completed data transmissions. As previously noted, these successfully completed data transmissions may, in some cases, also include stored call records associated with prior failed communication attempts by that vehicle. As shown at block 92, the data table can be updated to incorporate at least the vehicle data for the call records corresponding to the unsuccessful attempted data transmissions, where the updated table reflects the time of occurrence of the attempted data transmission for each of the successful and unsuccessful data transmissions. It should be recognized that reference to the "table" is not exclusive of other presentations, such as graphs and such, and thus updating the table includes updating other presentations of the data.

Figure 7:
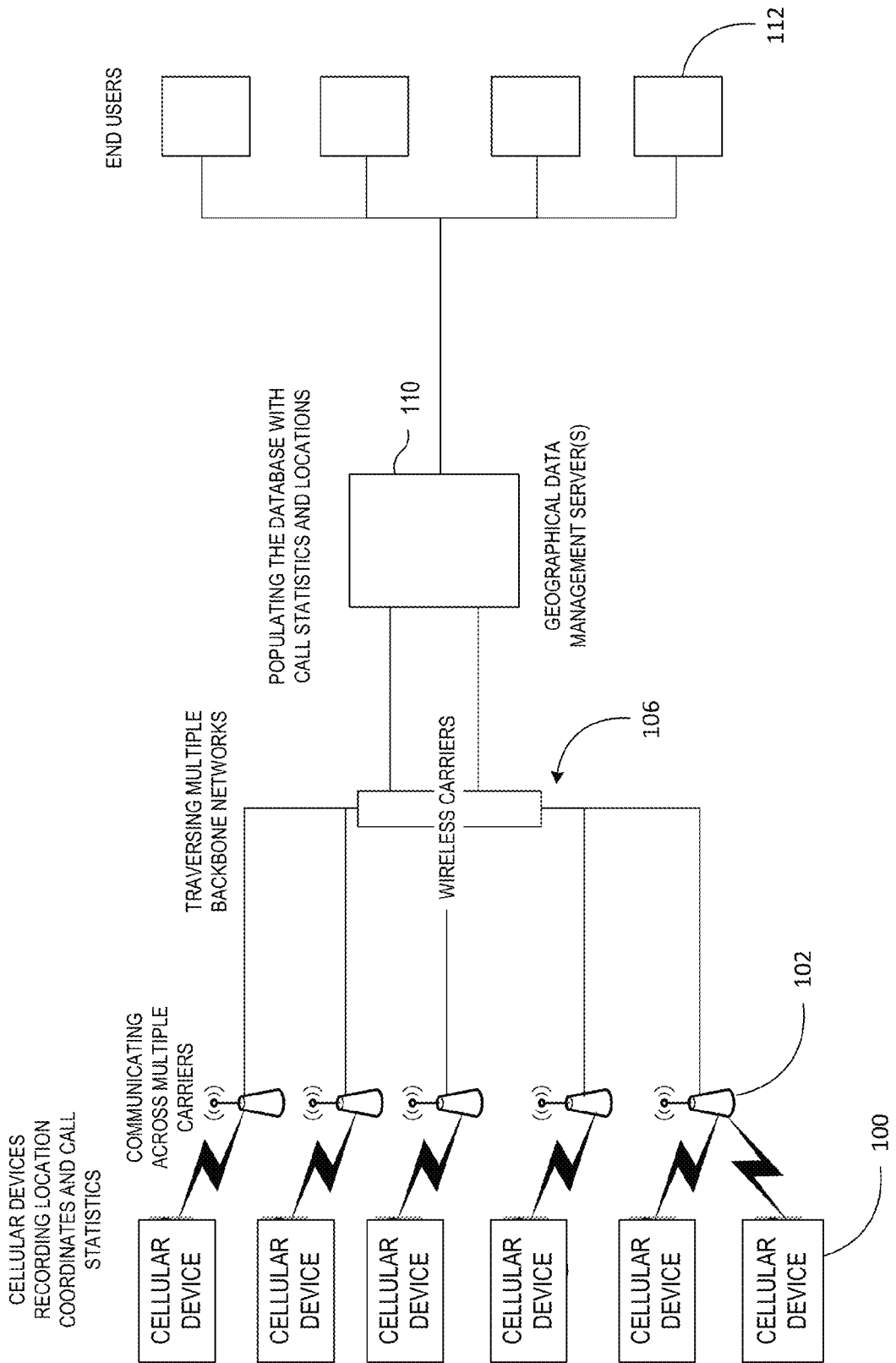
FIG. 7 is a diagram illustrating a representative system overview of an embodiment for monitoring cellular communication performance.

FIG. 7 is a diagram illustrating a representative system overview of an embodiment for monitoring cellular communication performance. It should be recognized that the principles described herein are equally applicable to other wireless technologies, such as satellite. Vehicles are equipped with a cellular device 100 that records location coordinates, call statistics and/or other call performance data. These devices 100 communicate wirelessly across multiple carriers, depicted by cellular infrastructure base stations 102. These carriers may include, for example, providers of CDMA, analog, satellite, etc. The communications traverse multiple backbone networks 106 before reaching one or more geographical data management servers 110. The database(s) associated with the servers 110 are populated with at least the call statistics and locations, where data is aggregated and processed in real-time and made available for long-term storage. Aggregated data may be converted into, for example, views, reports, graphs, charts and paging setups for end user 112 consumption.

Figure 8:
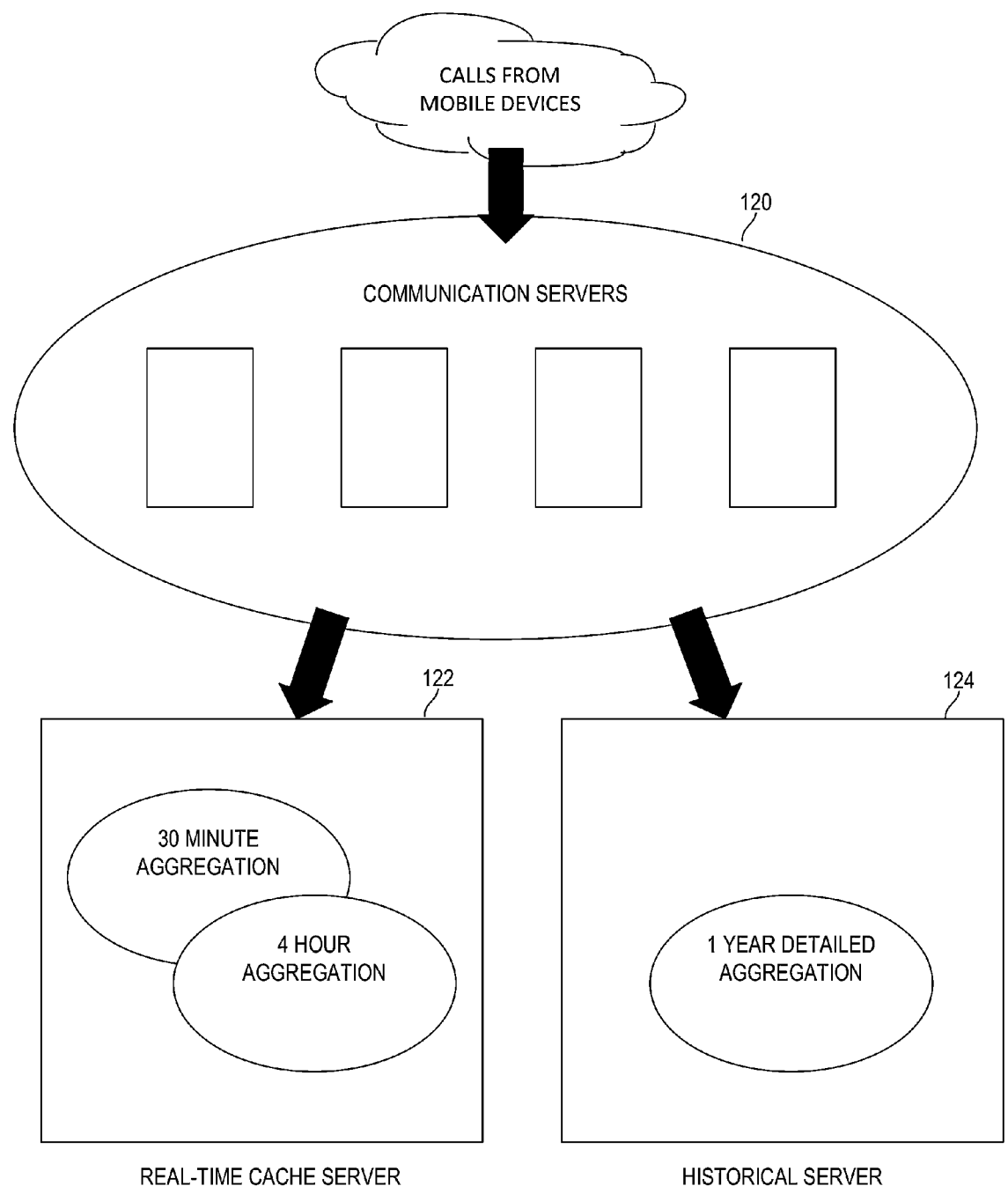
FIG. 8 is a block diagram of an exemplary collection of communication and call record processing servers for use in receiving and processing incoming call records.

As shown in FIG. 8, calls from mobile devices may first reach the communication servers 800. In one embodiment, the communication servers aggregate the data into multiple formats in multiple locations. End-user applications are then driven from the organized results. Such end-user applications may be provided via a real-time cache server 802, which can provide aggregated data over particular periods of time, such as thirty minutes, four hours, etc. Applications may also be provided via a historical server 804 where data is stored long-term, and aggregations of the data can be analyzed over longer periods of time.

Figure 9:
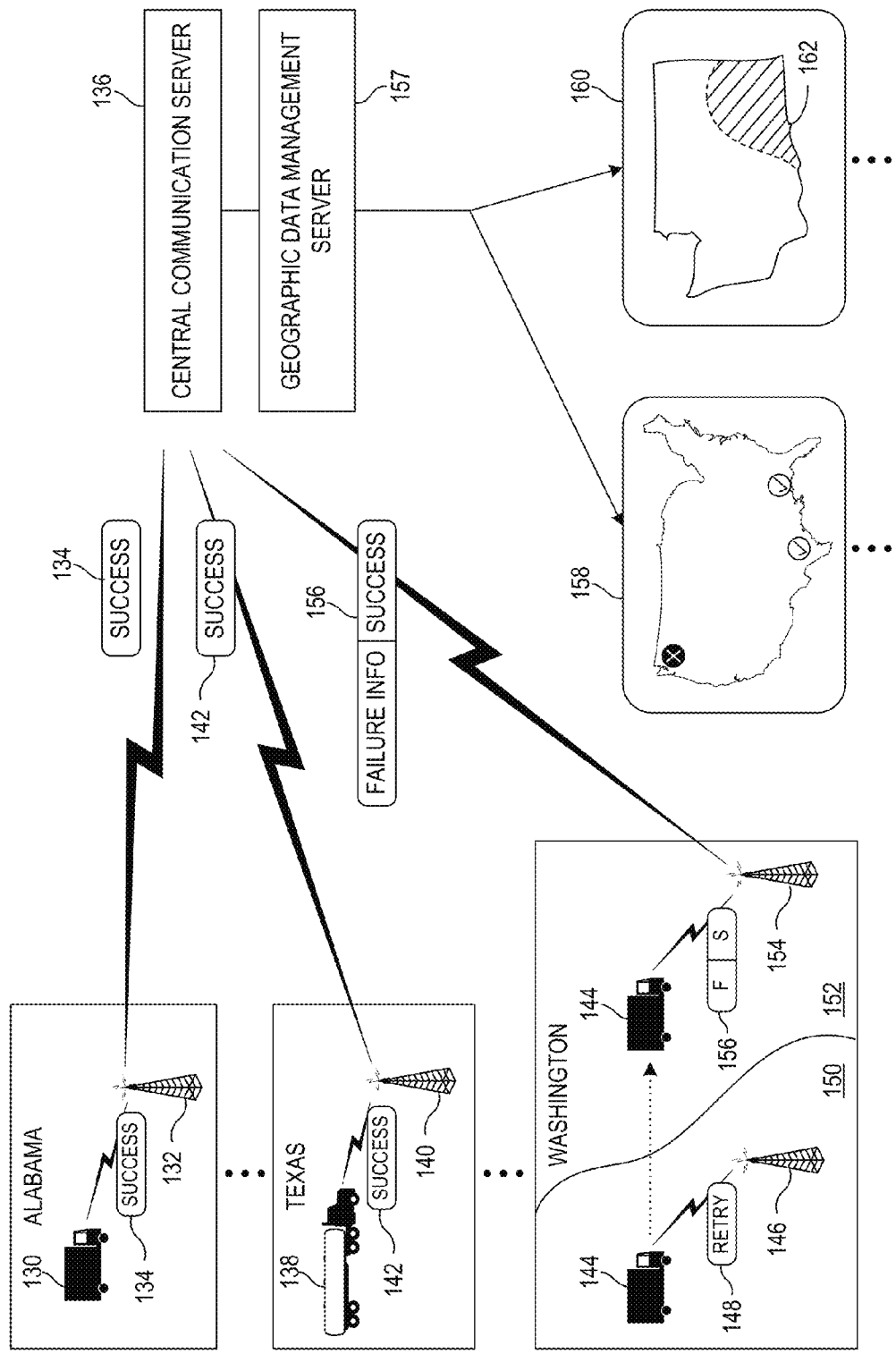
FIG. 9 is a block diagram generally illustrating a representative manner in which the data is collected and utilized.

FIG. 9 is a block diagram generally illustrating a representative manner in which the data is collected and utilized. The example is provided in terms of trucks equipped with communication devices, such as on-board computers having cellular and possibly other (e.g. satellite) communication capabilities. While a large number of trucks will be communicating data, only three trucks are shown in this example for purposes of illustration.

It is assumed that a truck 130 is traveling in a cellular area defined by the base station 132 in Alabama. The truck 130 attempts to communicate data, such as a call record. In this instance, the communication device in the truck was successful in transmitting the data, as depicted by the successful call record 134 which is provided to the central communication server(s) 136. Similarly, a truck 138 in a cellular area defined by base station 140 in Texas successfully transmits a call record 142 to the communication server 136. Truck 144 attempts to communicate in the cellular area defined by base station 146, but is unsuccessful. One or more communication retries 148 may be attempted. In this example, the truck 144 eventually travels out of the poorly functioning market 150, and into an operative market 152 where communication is effected via base station 154. In one example, the truck 144 enters a network in area 152 that is provided by another wireless carrier, in which case the truck 144 is roaming. In another example, a large provider may provide for a market that is segmented such that the same provider has multiple markets next to each other, where one of the markets 150 exhibits the problem. In any case, by moving from a failed or poorly operating market 150 to an operating market 152, the call record 156 can be transmitted. As previously noted, call records that were unable to be transmitted while in the bad area 150 can be appended or otherwise included with the successful call record, as depicted by call record 156 that is transmitted to the central communication server 136.

The call success/failure data 134, 142, 156 and locations of the trucks 130, 138, 144 reaches the communication server(s) 136 where it is aggregated into potentially multiple formats. The data may then be presented using, for example, a geographic data management server(s) 157 from which geographic information can be presented. For example, a large geographic area may be presented via a first display 158 that shows aggregated call success rates. Where a predetermined quantity or percentage of failures occur in an area, it may be marked on the map as such. On the same or different display 160, other graphical presentations can be provided, such as "zoomed in" geographic areas to more precisely show where problem areas 162 may lie.

Figures 10A, 10B:
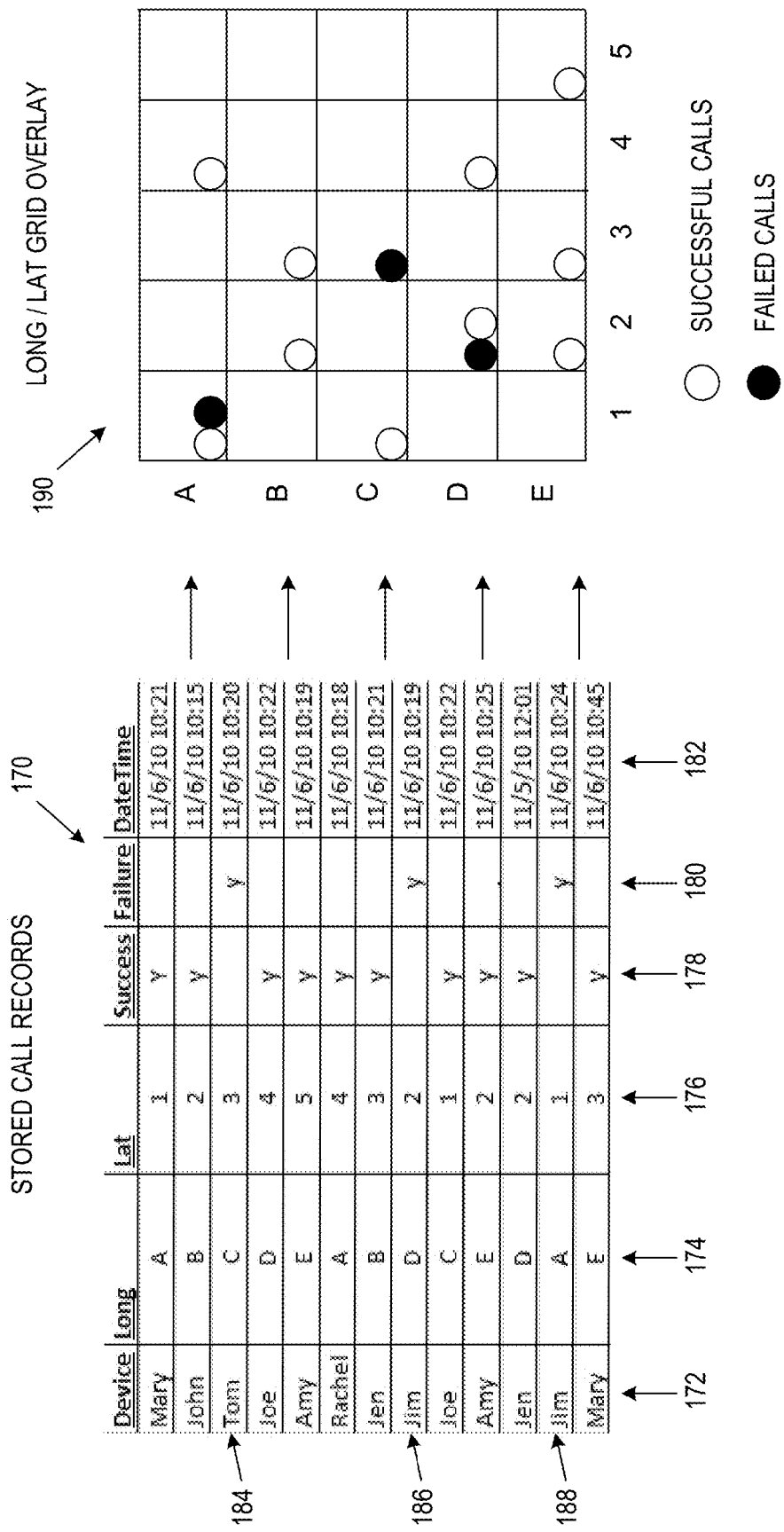
FIGS. 10A and 10B illustrate an exemplary manner in which stored call records may be plotted for ultimate presentation on one or more geographical maps.

The information provided by the communication devices in the trucks or other vehicles is stored at the central office communication servers, or elsewhere. In one embodiment, this information, or call records, includes a summary of the successful or failed data calls. FIGS. 10A and 10B illustrate how received call records can be depicted to an end-user. Referring to FIG. 10A, the stored call records 170 include a list of devices 172, labeled by driver, from which information has been received. The representative call records include a longitude 174 and a latitude 176 of the device 172 when the call was made (whether call initiation time, call disposition time, etc.). An indication of whether the call was successful 178 or unsuccessful 180 is associated with each call, as is the date and time 182 of the call.

As seen in FIG. 10A, three of the devices had call failures, including devices 184, 186 and 188. Each of these calls, as well as the successful calls, are thus mapped to a single GPS or other location coordinate, and plotted as shown in FIG. 10B. Light indicators represent successful calls, and dark indicators represent failed calls. The devices 184, 186 and 188 that experienced failed calls were, at the time of the call, at coordinates C-3, D-2 and A-1 respectively. As shown on the longitude/latitude grid overlay map 190, these three failed calls, represented by dark circles, are mapped to locations C-3, D-2 and A1. The remaining stored call records 170 that were successful are also mapped onto the overlay map 190 as shown.

The map 190 may be expanded out to any desired geographic area. For example, the area may be all of North America, where the area is subdivided into sub-areas that may reveal call success percentages of a very large number of devices. The area corresponding to the entire overlay map 190 could represent a single area of analysis on a larger map, where the success/failure ratio in the example of FIG. 10B would be 10/13, or a 77% call success rate. This success rate may be associated with a particular visual characteristic, such as a color, such that this block 190 would be shown having an attribute indicative of that call success rate. For example, a success rate of 90%-100% success may be shown in green, 80%-89% shown in blue, 60%-79% shown in purple, and below 60% is shown in red. In this instance, the entire map section 190 would be shown in red on an expanded map. On the other hand, the area may be drilled down to areas as small as a single cell tower to see individual calls, such as the individual calls shown in FIG. 10B.

Figure 11:
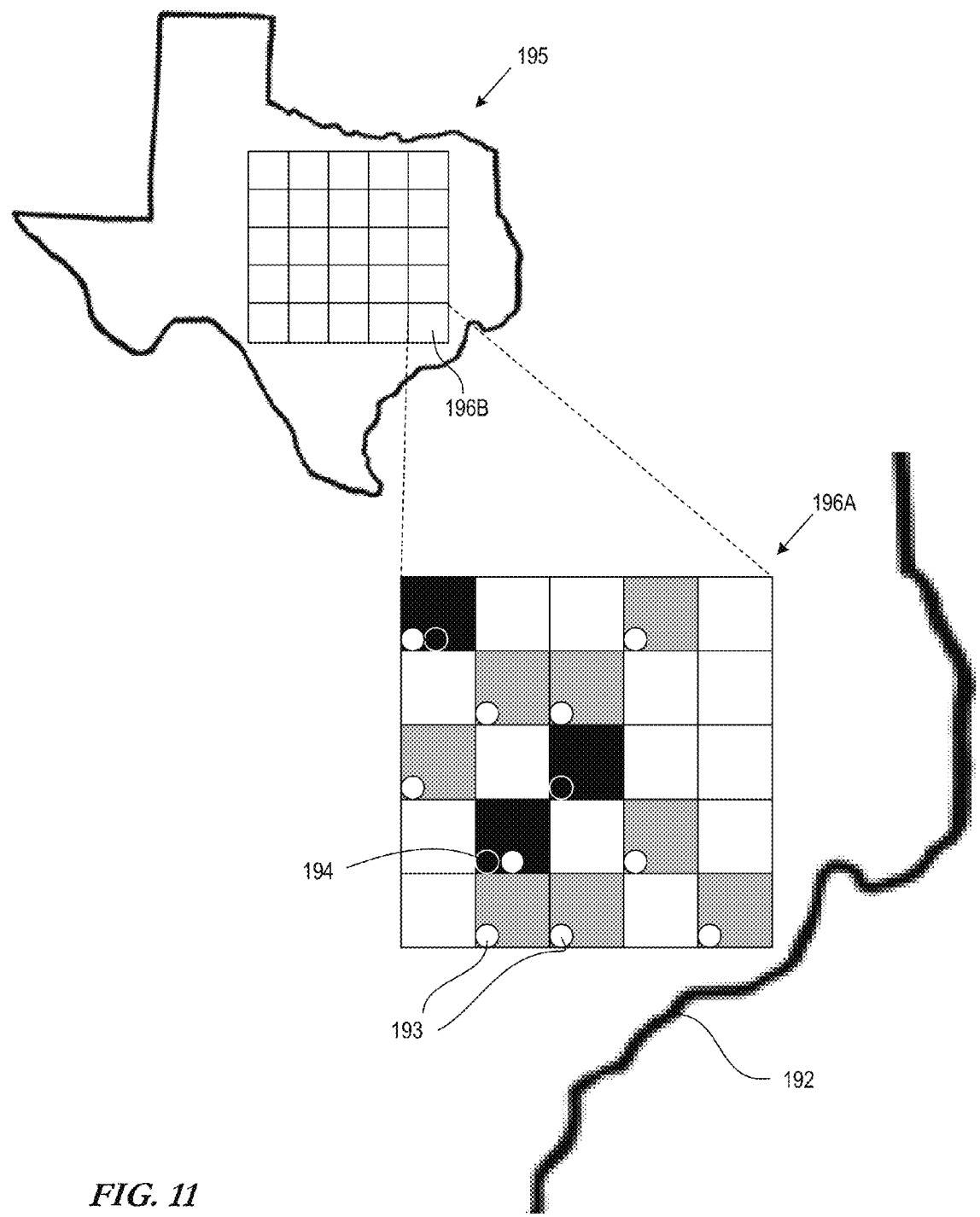
FIG. 11 illustrates an example of plotting call locations on grids and the configurable resolution of the call density.
Figure 12:
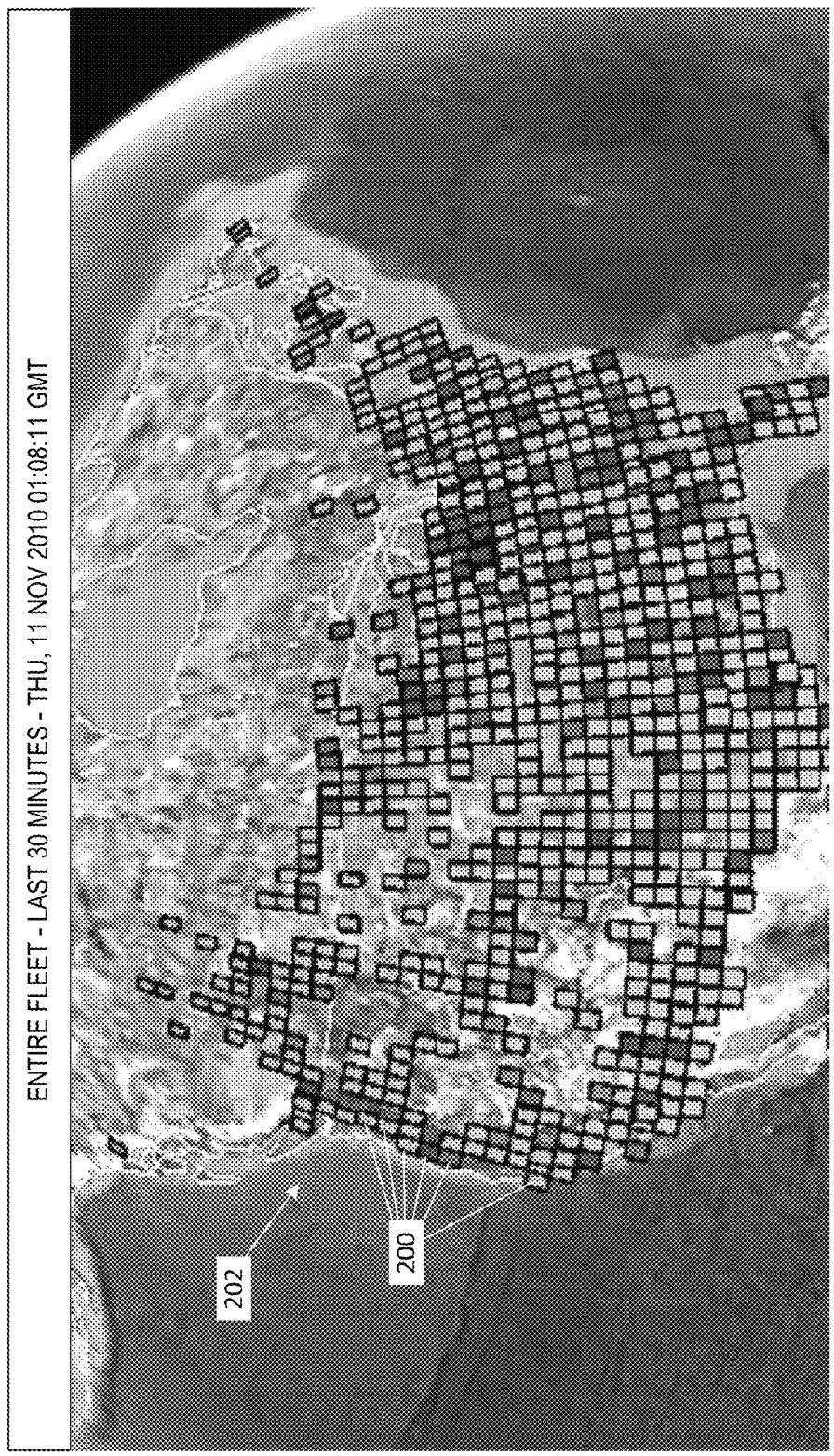
FIG. 12 illustrates a representative dashboard map, where call success rates are plotted over a large geographic area.

FIG. 11 illustrates the plotting of call locations on grids, where the resolution of the call density is configurable by zooming in and out of geographical areas. In this example, call data may be plotted in a geographic area 192 sufficiently small to see the individual calls, whether successful calls 193 or failed calls 194. The geographical area being analyzed can be changed, such as shown by the expanded view 195. In such an expanded view, call successes and failures can be aggregated into success percentages or otherwise. For example, based on the success-to-failure ratio of an area 196A, that area represented over a larger geographical area may be presented as a success percentage. Such information is, in one embodiment, automatically updated as call data is received at the central office. An example of such a presentation is shown in FIG. 12, where call success rates are plotted for relatively large geographical areas 200 over the U.S. and other parts of North America 202. Colors, numbers or other distinguishable indicia may be used to represent relative call success rates in each of these areas 200. The distinguishable indicia will dynamically change as call success rates in the various areas 200 change. Larger geographical areas showing unsatisfactory call success rates may be indicative of problems such as, for example, an outage or problem at the central office, wireless carrier issues ranging from local switch issues to larger backbone network problems, etc. Reasons for unsatisfactory call success rates may be more accurately identified using research and analysis tools described herein, where individual areas 200 may be iteratively or quickly expanded to more accurately see the plotting of calls. The view may be expanded to see individual calls, as is depicted by the area 196A of FIG. 11.

Figure 13:
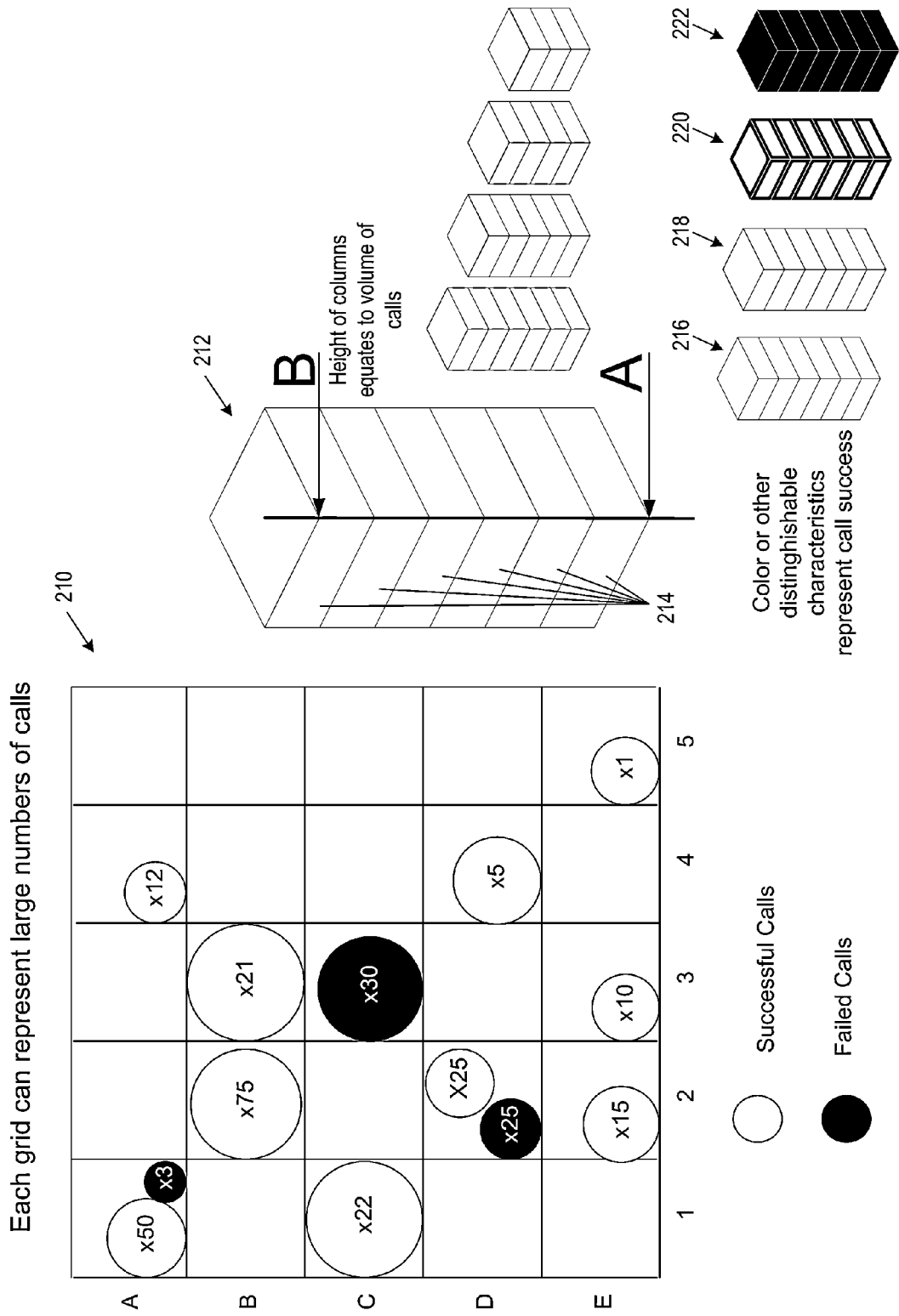
FIG. 13 illustrates an exemplary methodology for plotting call success rates and a representative manner of displaying the plotted information on geographical maps.

FIG. 13 illustrates another embodiment in which call successes and failures may be plotted in a meaningful way. The viewable grid 210 may correspond to any size of geographical area desired. The total grid, of which the viewable grid 210 may represent only a subset, can be populated with call data based on geographic location indicators, such as latitude and longitude obtained from GPS coordinates, cell tower information, etc. The grid 210 is divided into configurable subsections in which the location coordinates can be plotted. For purposes of illustration, the grid 210 includes only twenty-five such subsegments, although the actual number may be significantly higher (e.g. hundreds, thousands, etc.). As shown in the grid 210, of fifty-three calls made at coordinates within the subsection A-1, fifty of the calls were successful and three were unsuccessful. As shown at subsection C-3, all thirty calls were unsuccessful, which would indicate a more pervasive network problem in that area. If all calls were unsuccessful, it may indicate that the central office's devices have gone down such that all calls were unsuccessful. Thus, plotting successful and unsuccessful calls in this manner can help identify where root problems may lie. Additionally, the analysis and research tools described herein enable additional information to be analyzed (e.g. SIDs, type of communication error, etc.) to better identify the root of the problem.

FIG. 13 further illustrates another manner of presenting the successful and unsuccessful calls, with call volume also being introduced into the presentation. Where the presentation of FIG. 12 shows distinguishable call success/failure rates, the embodiment of FIG. 13 can depict relative call volume as well as call success/failure rates. Column 212 has a height that represents the volume of calls in an area or grid subsection. For example, each block 214 represents a number of calls, such as one hundred calls. The column 212 represents the total number of calls based on the value associated with each of the blocks 214.

Additionally, distinguishable indicia such as color can be applied to each column 212 to represent different call success rates. For example, four colors may be used, such that a column of color-1 216 indicates a success rate of 90%-100% success, a column of color-2 218 corresponds to 80%-89% success, a column of color-3 corresponds to 60%-79% success, and a column of color-4 corresponds to a success rate below 60%.

These columns of information can be plotted onto a geographical map, whether it be a two-dimensional map, a geographical satellite view of a selected portion of the earth, etc. Various representative manners for depicting at least call success/failure rates, and in some cases call volume, are shown in the examples of FIGS. 14A-14D. Thus, the data collected from the vehicles' communication devices can be used and presented in many ways. In one embodiment, an automatically updated "dashboard(s)" enables users to see real-time network performance over desired periods of time, such as 30 minutes, eight hours, etc. For example, the success/failure rates can be plotted to maps, such as geographical maps, satellite-generated maps, etc. In FIG. 14A, geographical areas exhibiting different call success rates are distinguished using color or shading, although patterns or other indicia could be used. For example, a first color associated with graphical areas 230 may represent a first call success rate, where a second color associated with graphical area 232 may represent a second call success rate.

As previously noted, in one embodiment a research tool is provided that provides graphs and/or tables or other presentations of statistics such as call success versus call failure. The tool is an interactive tool that facilitates research such as data mining. The tool can make use of additional information provided by the call records, such as SIDs, cellular strength or other conditions at the time of the call, disposition of the call, firmware versions, radio type, various identifiers, etc. FIGS. 14B-14D are examples of presentations used with such an interactive tool, where zooming in and out to desired areas is made possible. FIG. 14B illustrates a view that is zoomed to an area, such as a city. The height of the bars 234 can represent the call volume in an area. In some embodiments, the bars may be further colored or otherwise marked to distinguish call success rates. FIG. 14C illustrates another view similar to that of FIG. 14B, but using column data such as the column 212 and 216-222 of FIG. 13. Thus, both the call volume and call success rates can be plotted to the three-dimensional view of the area depicted in FIG. 14C. The view is configurable to drill down to particular areas of interest, as depicted in FIG. 14D.

Viewing call record data in given-duration "chunks" helps to breakout performance statistics such as call volume, success percentage and poorly performing markets and providers in a very comprehensible presentation. FIGS. 15A and 15B are illustrations of representative graphical and/or tabular data that is derived from the incoming call record data.

Figure 15:
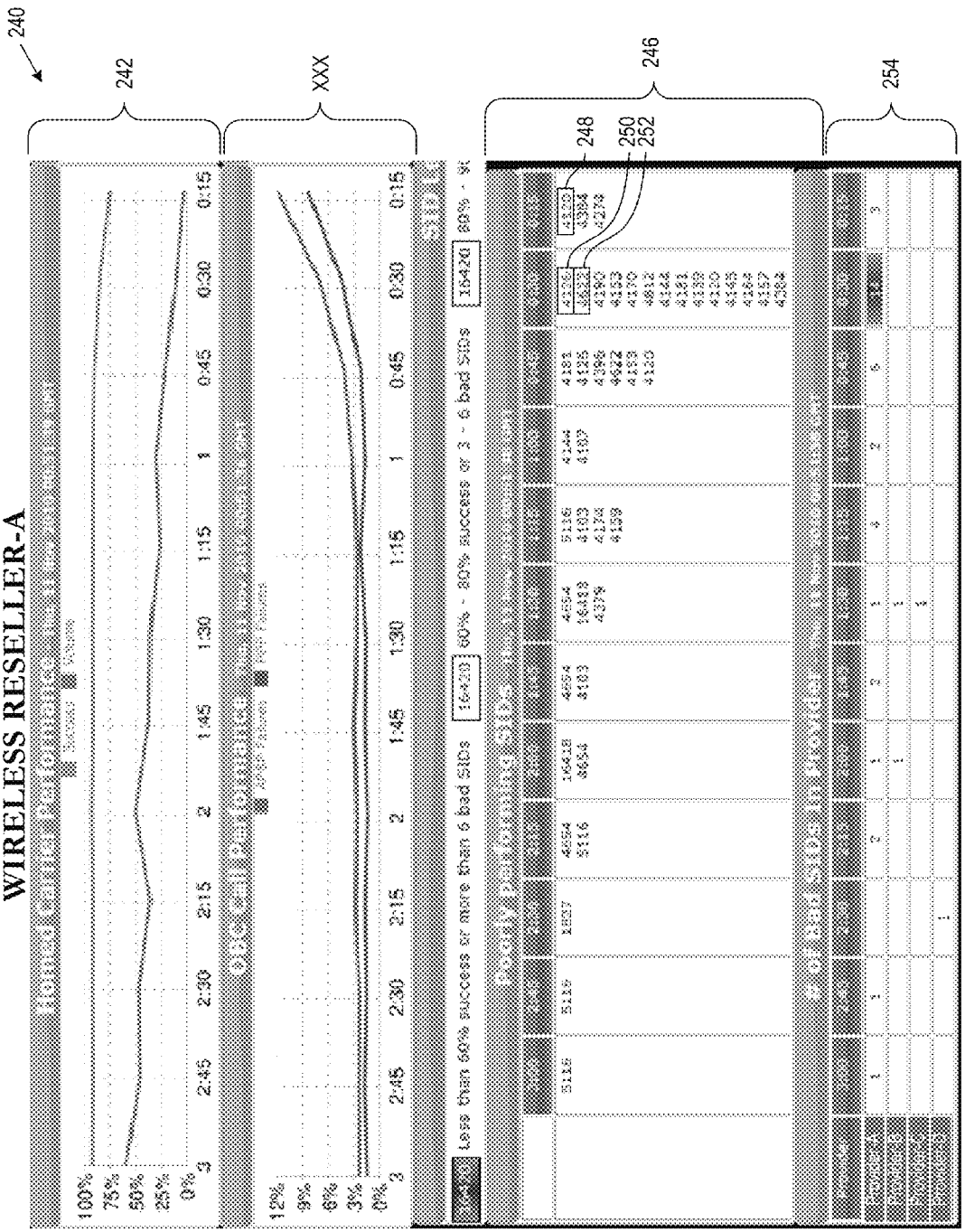
FIG. 15 illustrates the presentation of graphical and tabular data to facilitate identification of cellular or other wireless network deficiencies.

FIG. 15 illustrates graphical and tabular data 240 for a particular wireless carrier, which in the illustrated embodiment is depicted as wireless reseller-A. The top graph 242 is a double line graph for the homed carrier performance, which plots call volume and call success over a three hour period. The next graph 244 plots particular failures, namely APSP and PPP failures, over the same three hour period. APSP is a protocol in which the on-board computers in the vehicles communicate the information, while PPP (point-to-point) is a protocol typically used in establishing connections between networking nodes. The type of failure, e.g. APSP or PPP, can be obtained from data provided in the call records, which can then be plotted as shown in graph 244. PPP failures are usually caused by the carrier, and thus the plot can help identify what portion of the communication link failed to cause the unsuccessful call.

Graph 246 provides tabular information in the same time-frame as the graphs 240, 242 in the illustrated embodiment. Graph 246 identifies cellular areas by SID that have exhibited call failures. In one embodiment, if there is 80%-90% success or less than three bad SIDs, those SIDs are distinguished from other listed SIDS such as by color (e.g. blue). If there is a 60%-80% success or three to six bad SIDS, another color such as red may be used. If less than 60% success or more than six bad SIDS, another distinguishing feature is used, such as white lettering on a red background. In the illustrated embodiment, three of the SIDS 248, 250, 252 listed in the graph 246 exhibit a 60%-80% success rate or three to six bad SIDS. Based on the wireless provider associated with the SID, the number of bad SIDS for that provider can be shown in graph 254.

The backfilling concept was previously described. The information associated with the graphical and tabular data 240 in FIG. 15 may be updated using the backfilling process previously described. For example, as call records identifying unsuccessful call attempts arrive with successful call records, the information from the call records identifying the unsuccessful call attempts can be inserted back in time in the timeline, to the time in which the call failure occurred.

In one embodiment, alerts can be set to provide notifications if certain events occur. For example, if performance of a network is seen to be poor, or a threshold of bad SIDs is exceeded, a notification can be issued locally on the server or transmitted to the appropriate area or person. In some cases, data that shows a trend towards a certain network(s) failing may result in providing an indication to the vehicle to switch to another communication type, such as switching to satellite communications from potentially failing cellular communications. Thus, the information from the research tools enable proactive actions rather than waiting for a problem to proliferate and cause further communication failures.

Incoming data may be stored in real-time cache servers to enable substantially real-time presentation of the data. These or other storage can retain the call data for a sufficient time to review, compare or otherwise analyze past data. As noted in FIG. 8, a historical server may be provided. Thus, analysis of call records from those most recently received to those received long ago is supported. In accordance with embodiments of the invention, research is enabled on past call data. FIG. 16 represents an example of analyzing past call record data. The example of FIG. 16 represents a tabular example 260 of mobile devices, e.g. on-board computing/communication devices, with an abnormal amount of data calls within the last eight hours and details about those units. Such information can further enable diagnosis of problems and causes thereof.

Figure 17:
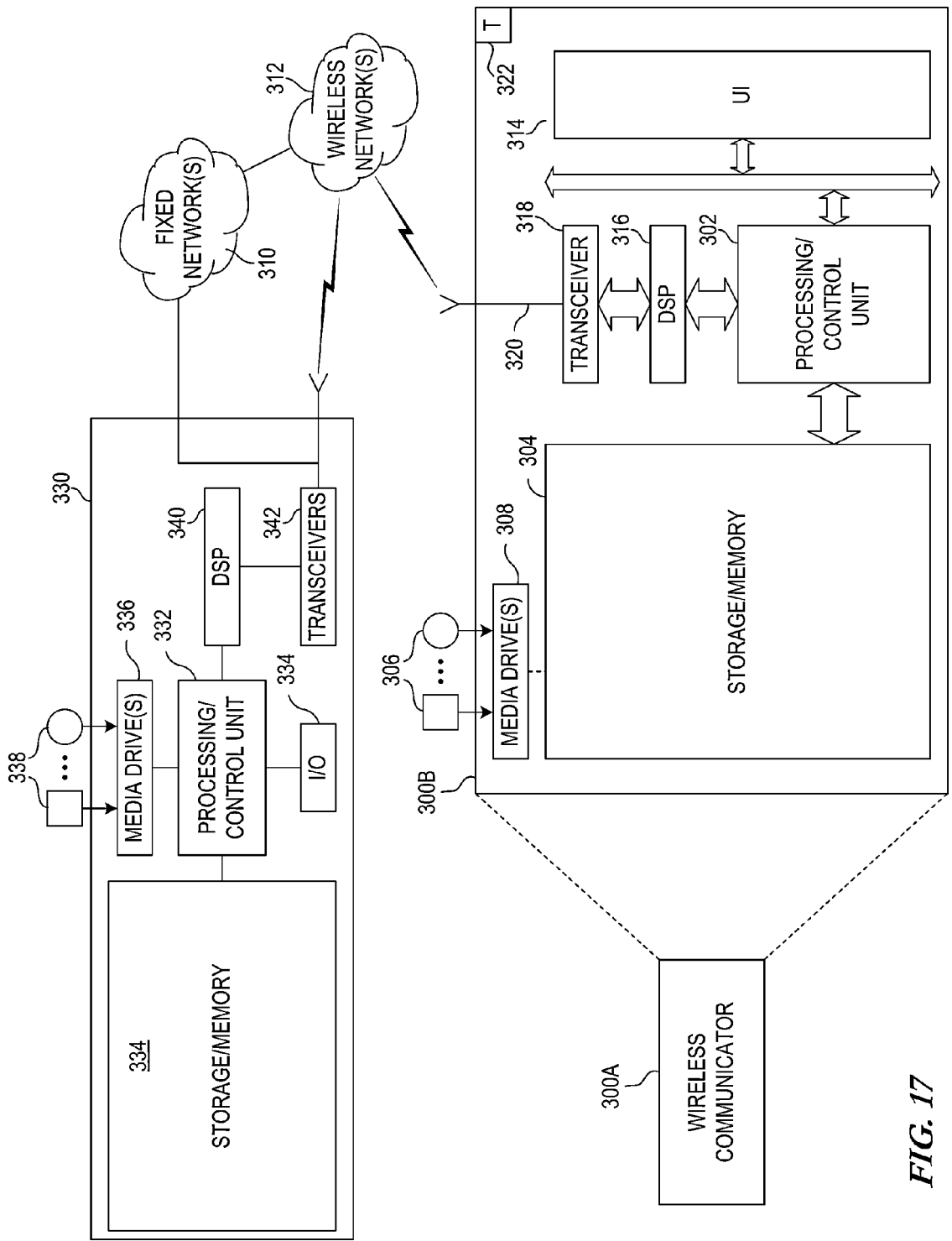
FIG. 17 illustrates representative communication devices that may be used in connection with the described techniques to transmit and/or receive call records.

FIG. 17 illustrates representative communication devices that may be used in connection with the techniques described herein to transmit and/or receive information such as data call records. The wireless communicator 300A represents any communication device capable of performing the vehicle communication functions previously described, such as an on-board computer (OBC). In the illustrated embodiment, the device 300A represents a device capable of communicating over-the-air (OTA) with wireless networks, such as by way of any one or more of cellular, satellite, etc.

The representative terminal 300A utilizes computing technology to, among other things, control and manage the wireless communication functions at the vehicle. For example, the representative wireless device 300B includes a processing/control unit 302, such as a microprocessor, controller, reduced instruction set computer (RISC), or other central processing module. The processing unit 302 need not be a single device, and may include one or more processors. For example, the processing unit may include a master processor and one or more associated slave processors coupled to communicate with the master processor.

The processing unit 302 controls the basic functions of the device 300B as dictated by programs available in the program storage/memory 304. The storage/memory 304 may include an operating system and various program and data modules, such as for collecting the data associated with a call record and communicating the call record. In one embodiment, the programs are stored in non-volatile storage to retain the programs upon loss of power. The storage 304 may also include one or more of other types of read-only memory (ROM) and programmable and/or erasable ROM, random access memory (RAM), subscriber interface module (SIM), wireless interface module (WIM), smart card, or other fixed or removable memory device/media. The functional programs may also be provided by way of external media 306, such as disks, CD-ROM, DVD, or the like, which are read by the appropriate interfaces and/or media drive(s) 308. The relevant software for carrying out operations in accordance with the present invention may also be transmitted to the device 300B via data signals, such as being downloaded electronically via one or more networks, such as the data network(s) 310 and/or wireless network(s) 312.

The processor 302 may also be coupled to a user interface (UI) 314 integral with, or connectable to, the device 300B. The UI 314 may include, for example, a keypad, function buttons, joystick, scrolling mechanism (e.g., mouse, trackball), touch pad/screen, or other user entry mechanisms (not shown), as well as a display, speaker, tactile feedback, etc.

The representative wireless device 300B of FIG. 17 also includes conventional circuitry for performing wireless transmissions over the wireless network(s) 312. A DSP 316 may be employed to perform a variety of functions, including analog-to-digital (A/D) conversion, digital-to-analog (D/A) conversion, encryption/decryption, error detection and correction, bit stream translation, filtering, etc. A transceiver 318 includes at least a transmitter to provide call records, and may also include a receiver, thereby transmitting outgoing radio signals and receiving incoming radio signals, generally by way of an antenna 320. The device 300B may also include other types of transceivers 322, such as to enable wired connections to other devices such as diagnostic devices, or to connect to wireless or wired local area networks.

FIG. 17 also depicts a representative computing system 330 operable on the network, such as the aggregation of communication servers, real-time cache servers, historical servers, etc. The computing system(s) 330 may be communicated with via the wireless network(s) 312 and/or fixed network(s) 310. In one embodiment, the computing system 330 represents at least the communication servers and associated computing power to collect, aggregate, process and/or present the data associated with call records. The system 330 may be a single system or a distributed system. The illustrated computing system 330 includes a processing arrangement 332, such as one or more processors, which are coupled to the storage/memory 334. The processor 332 carries out a variety of standard computing functions as is known in the art, as dictated by software and/or firmware instructions. The storage/memory 334 may represent firmware, media storage, memory, etc.

The processor 332 may communicate with other internal and external components through input/output (I/O) circuitry 334. The computing system 330 may also include media drives 336, such as hard and floppy disk drives, CD-ROM drives, DVD drives, and other media 338 capable of reading and/or storing information. In one embodiment, software for carrying out the operations at the computing system 330 may be stored and distributed on CD-ROM, diskette, magnetic media, removable memory, or other form of media capable of portably storing information, as represented by media devices 338. Such software may also be transmitted to the system 330 via data signals, such as being downloaded electronically via a network such as the data network 310, Local Area Network (LAN) (not shown), wireless network 312, and/or any combination thereof. The storage/memory 334 and/or media devices 338 store the various programs and data used in connection with the present invention.

The illustrated computing system 330 may also include DSP circuitry 340, and at least one transceiver 342 (which is intended to also refer to discrete transmitter/receiver components). The server 330 and transceiver(s) 342 may be configured to communicate with one or both of the fixed network 310 and wireless network 312.

Hardware, firmware, software or a combination thereof may be used to perform the functions and operations described herein. Using the foregoing specification, some embodiments of the invention may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device.

From the description provided herein, those skilled in the art are readily able to combine software created as described with appropriate general purpose or special purpose computer hardware to create a computing system and/or computing subcomponents embodying the invention, and to create a computing system(s) and/or computing subcomponents for carrying out the method(s) of the invention.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A method, comprising:
   producing call records at each of a plurality of vehicles, wherein each of the call records comprises at least a geographic location of the respective vehicle and network carrier information when transmission of the call record was attempted;
   receiving the call records associated with successful call record communication attempts in substantially real-time in response to the respective vehicles having moved into an operable network area from a defective network area that caused the unsuccessful call record communication attempts;
   receiving the call records associated with unsuccessful call record communication attempts by way of their transmission with successful call record communication attempts;
   aggregating indications of successful and unsuccessful call record communication attempts by geographic area as determined from a geographic location of the vehicles indicated in the respective call records; and
   determining a call success rate level for each of the geographic areas based on the aggregated indications of successful and unsuccessful call record communication attempts.

2. The method of claim 1, further comprising presenting graphical output distinguishing the relative call success rate levels of the plurality of the geographic areas.

3. The method of claim 1, further comprising:
   presenting a geographic map inclusive of a plurality of the geographic areas; and
   distinguishing on the geographic map the relative call success rate levels of the plurality of the geographic areas.

4. The method of claim 1, wherein:
   each of the call records further includes an indication of a time in which the communication of the call record was attempted; and
   the method further comprises presenting a chronological timeline of the aggregated indications of successful and unsuccessful call record communication attempts by geographic area.

5. The method of claim 4, wherein:
   presenting the chronological timeline comprises presenting the successful call record communication attempts on the timeline in substantially real-time; and
   presenting the unsuccessful call record communication attempts on the timeline at a prior time on the timeline corresponding to the time in which the unsuccessful call record communication was attempted.

6. The method of claim 1, further comprising:
   configuring a size of the geographic areas;
   wherein determining a call success rate level for each of the geographic areas comprises determining a call success rate level for the configured size of each of the geographic areas.

7. The method of claim 1, wherein:
   each of the call records further includes an identifier of the network carrier utilized in the attempted transmission of the call record; and
   the method further comprises presenting an identification of the network carriers associated with at least the unsuccessful call record attempts.

8. The method of claim 1, wherein the call records comprise one or more of:
   an indication of received signal strength;
   communication signal quality data;
   an indication of a communication system identifier (SID) area or market;
   an indication of switch transfer success;
   an indication of a point-to-point failure; and
   an indication of a failure at a roaming provider.

9. A method, comprising:
   moving a plurality of wireless communication devices by a plurality of vehicles relative to a plurality of geographically defined communication service regions;
   initiating data transmissions comprising vehicle data, location data, and network carrier information by the communication devices as the vehicles move in, through, and out of the geographically defined communication service regions,
   storing, locally at each vehicle, at least the vehicle data, the location data, and the network carrier information associated with each data transmission as a call record;
   receiving, in substantially real-time at a central office, call records from the communication devices that successfully complete the data transmission with the central office;

receiving, at the central office, the call records for unsuccessful attempted data transmissions by way of call records of successfully completed data transmissions with the central office;

storing, in substantially real-time in a database at the central office, at least the vehicle and location data for call records received at the central office via the successfully completed data transmissions; and updating the database to incorporate at least the vehicle data, the location data, and the network carrier information for call records corresponding to the unsuccessful attempted data transmissions.

10. The method of claim 9, wherein updating the database comprises updating a data table reflecting time of occurrence of the attempted data transmission for each of the successful and unsuccessful data transmissions.

11. The method of claim 10, wherein updating the data table comprises backfilling the data table with the vehicle data associated with call records for the unsuccessful attempted data transmissions so that the vehicle data and the network carrier information for all received call records reflected in the data table can be organized according to time of data transmission initiation.

12. The method of claim 9, comprising calculating a metric indicative of successful transmission of call records from the vehicles to the central office.

13. The method of claim 12, wherein calculating the metric comprises determining which of a plurality of potential points of failure contributed to the inability to successfully establish a connection between a particular communication device and the central office at the time of data transmission initiation.

14. The method of claim 9, wherein the network carrier information comprises one or more of:
an indication of a failure at a cell tower;
an indication of a failure of a switch associated with a cell tower;
an indication of a failure at a roaming provider;
an indication of a failure at a home provider; and
an indication of a failure of an Internet connection to the central office.

15. The method of claim 9, wherein the network carrier information comprises one or more of:
an indication of received signal strength;
communication signal quality data;
an indication of a communication system identifier (SID) area or market; and
an indication of a point-to-point failure.

16. A system, comprising:
a mobile communication apparatus, comprising:
a wireless communication device configured for deployment at a vehicle that transits relative to a plurality of geographically defined communication service regions;
a processor coupled to the communication device and configured to initiate data transmissions comprising vehicle data, location data, and network carrier information as the vehicle moves in, through, and out of the geographically defined communication service regions; and
memory coupled to the processor and configured to store at least the vehicle data, the location data, and the network carrier information associated with each data transmission as a call record; and
a remote system configured to communicate with each of a plurality of the mobile communication apparatuses, the remote system comprising:
a receiver configured to receive, in substantially real-time, call records from the communication devices that successfully establish a connection with the remote system at the time of data transmission initiation;
the receiver configured to receive, in a store and forward mode, call records from the communication devices that were unable to successfully establish a connection with the remote system at the time of data transmission initiation;
a processor configured to store, in substantially real-time in a database, at least the vehicle and location data for call records received at the remote system via the successfully established connections; and
the processor configured to update the database to incorporate at least the vehicle data, the location data, and the network carrier information for call records received at the remote system via the store and forward mode.

17. The system of claim 16, wherein the processor of the remote system is configured to update a data table reflecting time of occurrence of a data transmission attempt for each of the successful and unsuccessful data transmissions.

18. The system of claim 17, wherein the processor of the remote system is configured to backfill the data table with the vehicle data, the location data, and the network carrier information associated with call records for the unsuccessful attempted data transmissions so that the vehicle data, the location data, and the network carrier information for all received call records reflected in the data table can be organized according to time of data transmission initiation.

19. The system of claim 16, wherein the processor of the remote system is configured to calculate a metric indicative of successful transmission of call records from the vehicles to the remote system.

20. The system of claim 19, wherein the processor is configured to determine which of a plurality of potential points of failure contributed to the inability to successfully establish a connection between a particular communication device and the remote system at the time of data transmission initiation.

* * * * *